(12) United States Patent
O'Shaughnessy et al.

(10) Patent No.: US 8,584,022 B1
(45) Date of Patent: *Nov. 12, 2013

(54) SYSTEM AND METHOD FOR ORGANIZING, MANAGING, AND MANIPULATING DESKTOP OBJECTS WITH AN ACTIVITY-ORIENTED USER INTERFACE

(75) Inventors: Gerald E. O'Shaughnessy, Wichita, KS (US); Vladimir Spirin, Herndon, VA (US); Alexei Ivlev, Barnaul (RU); Oskar Karash, Katy, TX (US); Denis Medvedev, Moscow (RU)

(73) Assignee: Everez Systems Limited, Isle of Man (GB)

( * ) Notice: Subject to any disclaimer, the term of this patent is extended or adjusted under 35 U.S.C. 154(b) by 1333 days.

This patent is subject to a terminal disclaimer.

(21) Appl. No.: 11/748,289

(22) Filed: May 14, 2007

Related U.S. Application Data

(63) Continuation of application No. 09/908,983, filed on Jul. 19, 2001, now Pat. No. 7,219,302.

(60) Provisional application No. 60/219,294, filed on Jul. 19, 2000.

(51) Int. Cl.
*G06F 3/048* (2013.01)

(52) U.S. Cl.
USPC ........... 715/752; 715/209; 715/212; 715/230; 715/231; 715/853; 707/829; 707/821; 707/828

(58) Field of Classification Search
USPC .......... 707/100, 821, 828, 829; 715/209, 212, 715/230, 231, 853, 751, 752
See application file for complete search history.

(56) References Cited

U.S. PATENT DOCUMENTS

| | | | |
|---|---|---|---|
| 5,283,856 | A | 2/1994 | Gross et al. |
| 5,627,764 | A | 5/1997 | Schutzman et al. |
| 5,706,211 | A | 1/1998 | Beletic et al. |
| 5,825,357 | A | 10/1998 | Malamud et al. |
| 5,838,322 | A | 11/1998 | Nakajima et al. |
| 5,899,995 | A | 5/1999 | Millier et al. |
| 5,920,316 | A | 7/1999 | Oran et al. |
| 6,014,688 | A | 1/2000 | Venkatraman et al. |
| 6,088,696 | A | 7/2000 | Moon et al. |
| 6,147,687 | A | 11/2000 | Wanderski |
| 6,212,512 | B1 | 4/2001 | Barney et al. |

(Continued)

FOREIGN PATENT DOCUMENTS

WO   01/65336 A2   2/2001

OTHER PUBLICATIONS

Microsoft Outlook, Copyright 1998 (Screenshots 1-19).

*Primary Examiner* — William Bashore
*Assistant Examiner* — David Choi
(74) *Attorney, Agent, or Firm* — Gerry J. Elman; Elman Technology Law, P.C.

(57) ABSTRACT

An email client and file manager provides combined file management and communications management in a single interface. An interface allows documents, email messages, contact information, web links or pages, and user-attached notes to be stored in the same folders. This facilitates communication by email and fax. The interface permits the user to combine this data in folders which the user categorizes according to a folder tree created by the user. In one embodiment of the invention, the client, in its email function, communicates with a dedicated host which in turn communicates with external servers according to standard internet protocol.

7 Claims, 37 Drawing Sheets

(56) References Cited

U.S. PATENT DOCUMENTS

| | | |
|---|---|---|
| 6,353,823 B1 * | 3/2002 | Kumar .................................. 1/1 |
| 6,370,538 B1 * | 4/2002 | Lamping et al. ...................... 1/1 |
| 6,418,429 B1 | 7/2002 | Borovoy et al. |
| 6,546,417 B1 | 4/2003 | Baker |
| 7,693,866 B1 * | 4/2010 | Weaver et al. ......... 707/999.107 |
| 2002/0099719 A1 * | 7/2002 | Schwitters et al. ........ 707/104.1 |

* cited by examiner

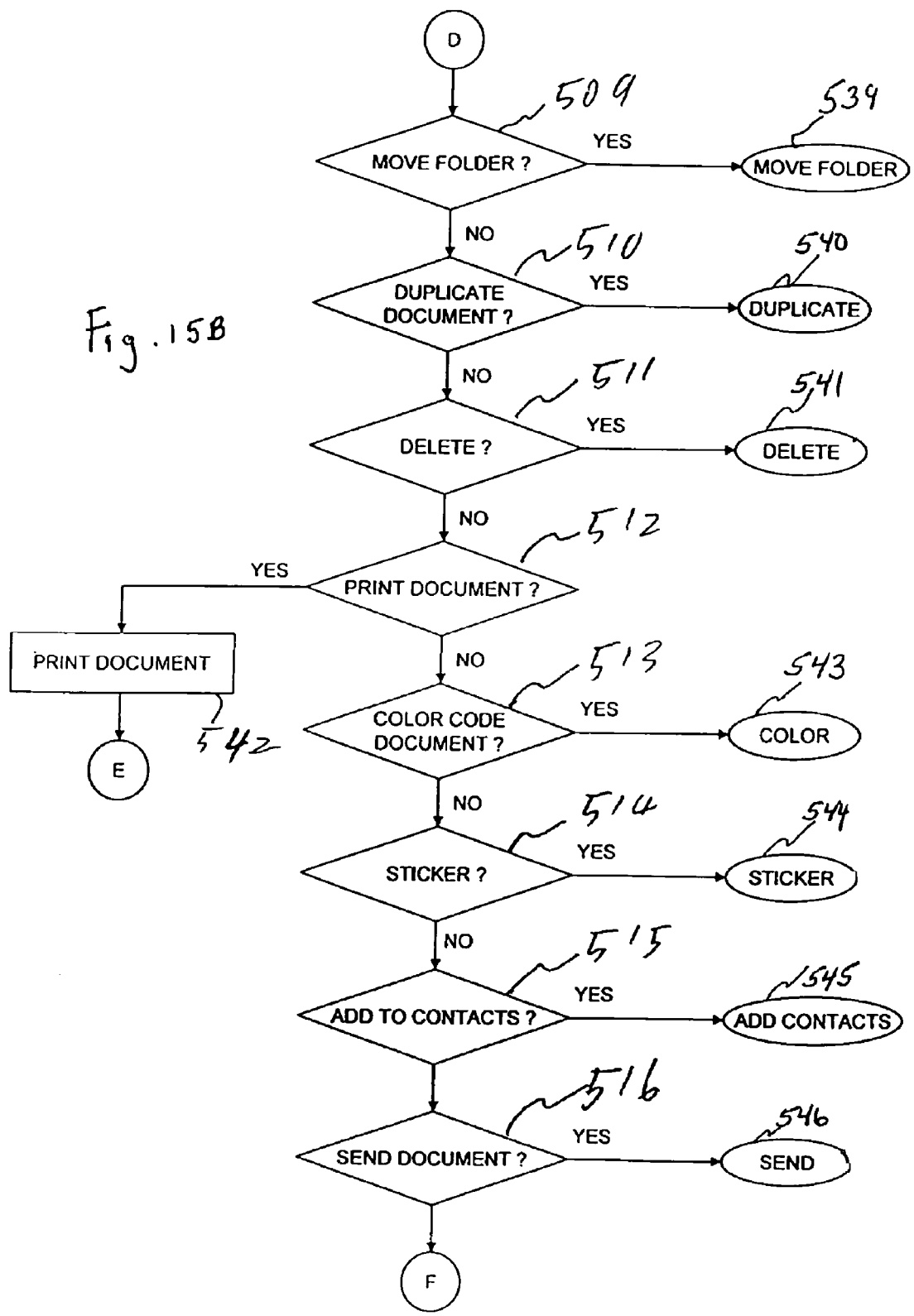

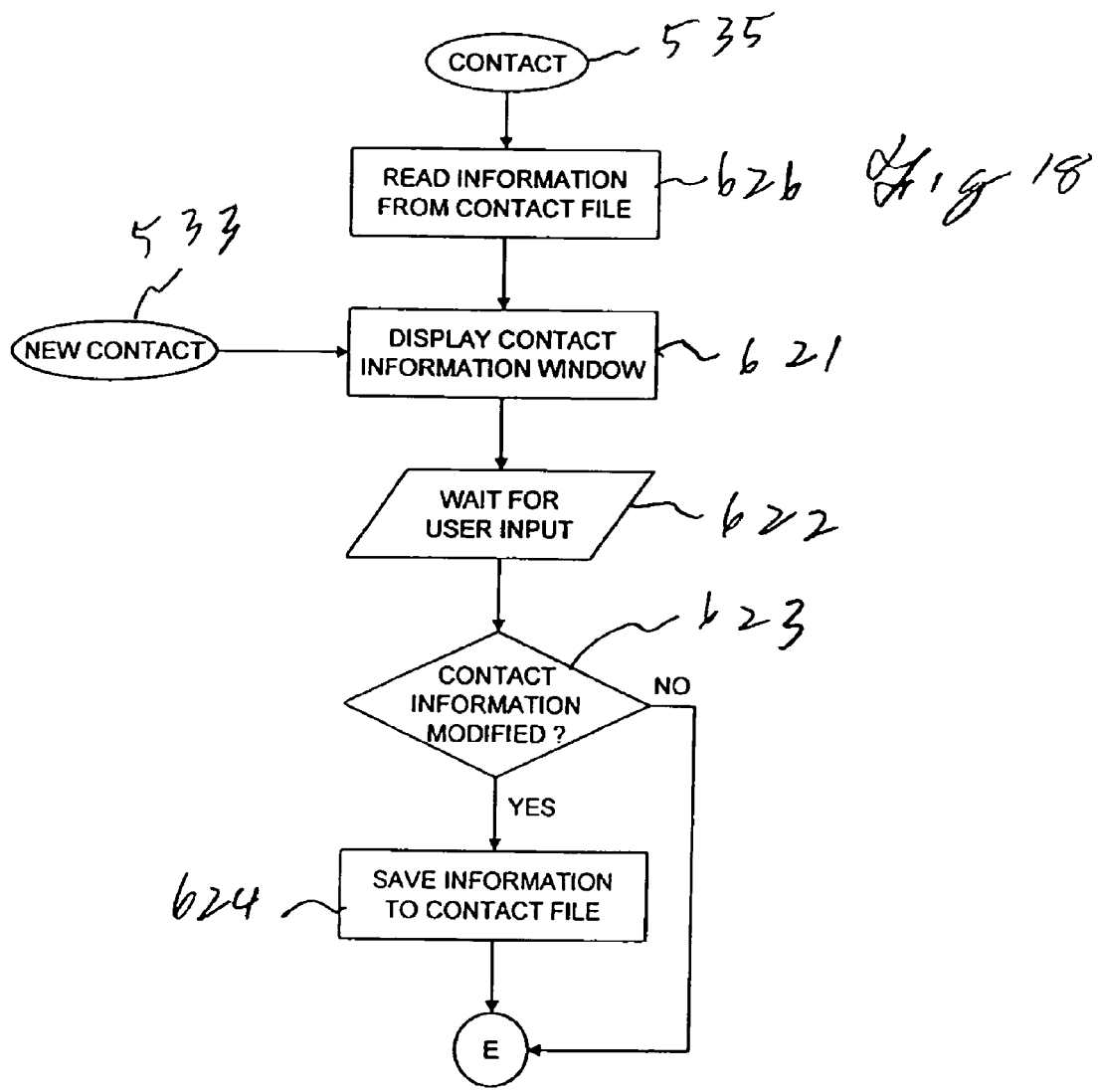

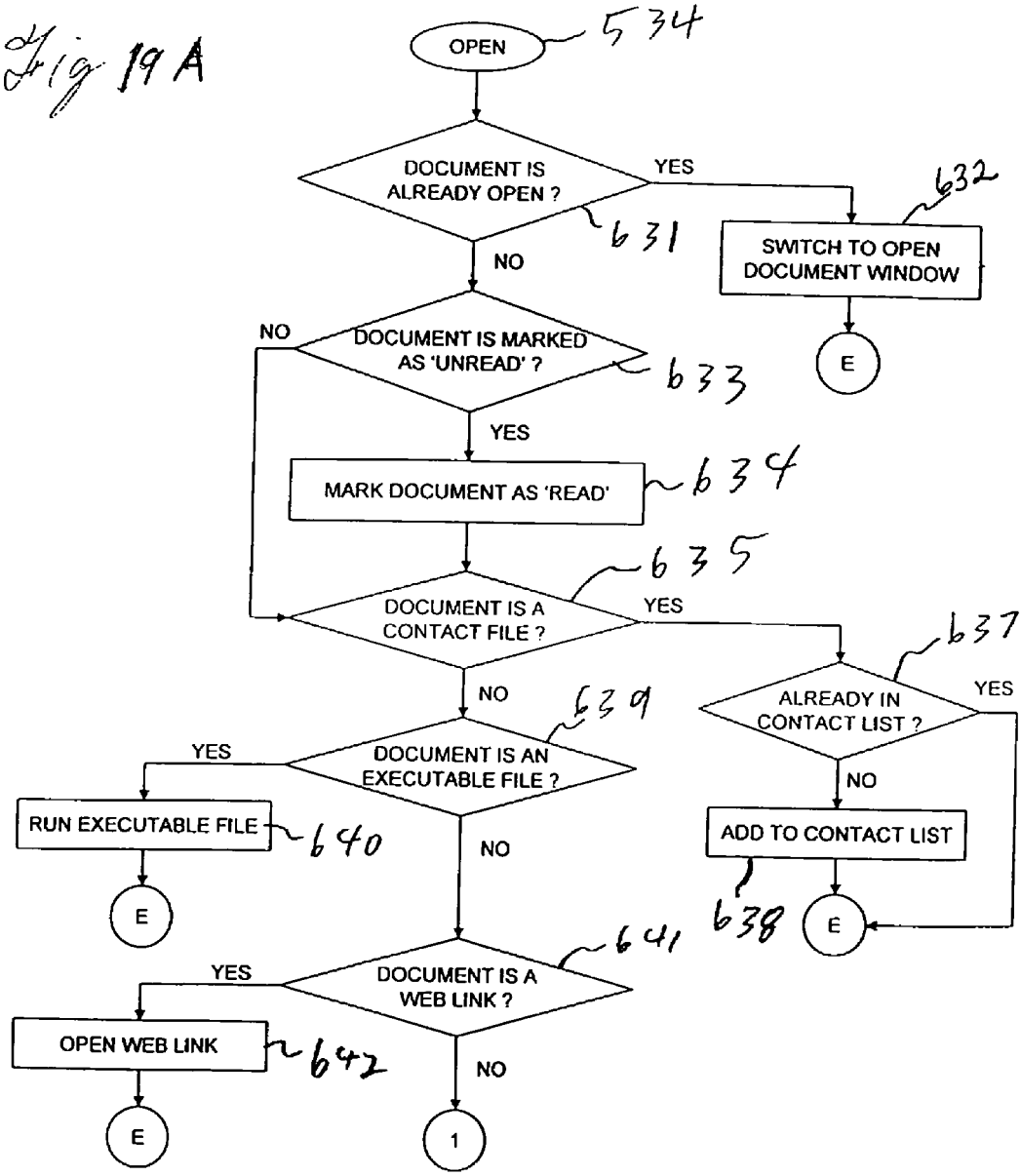

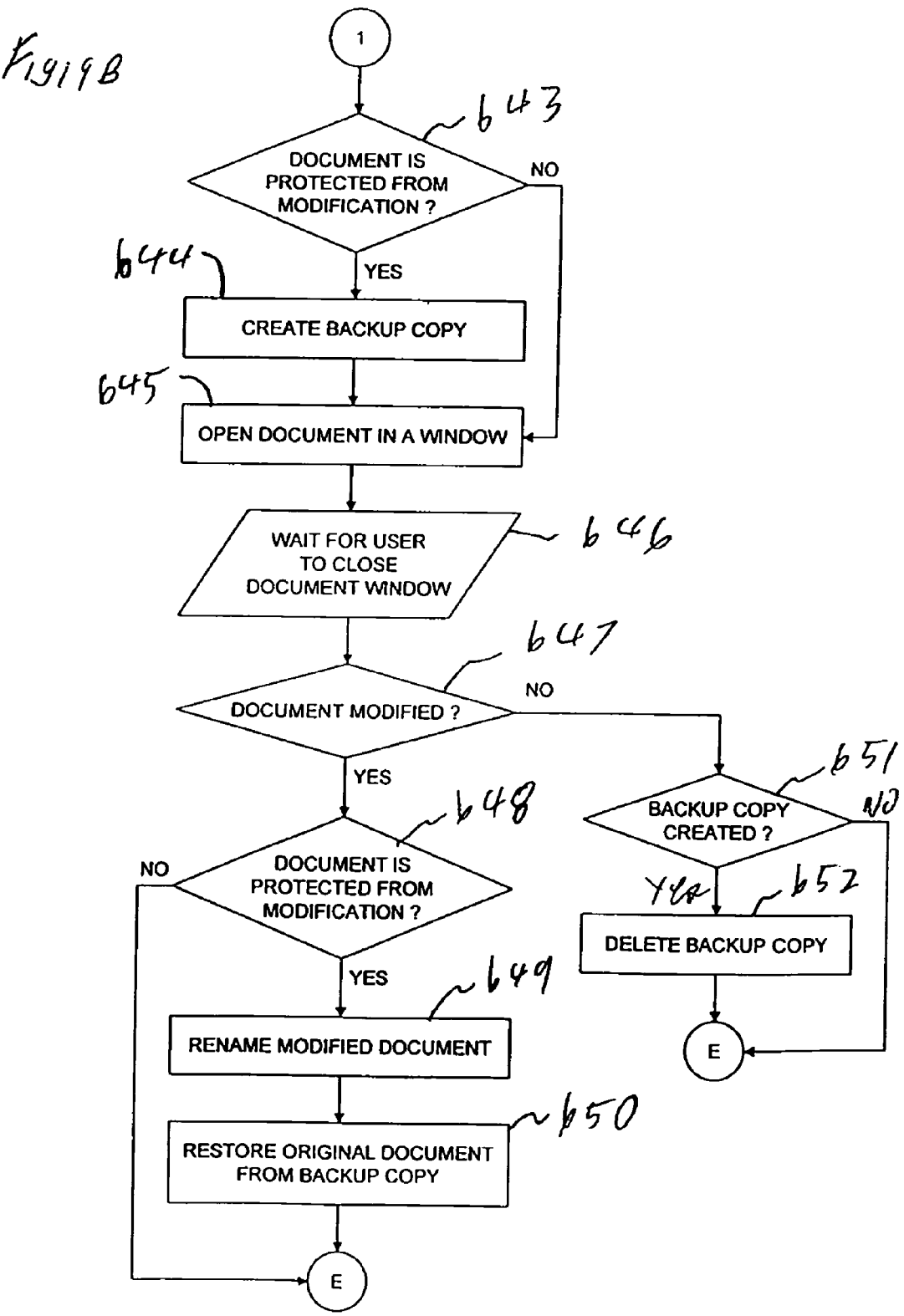

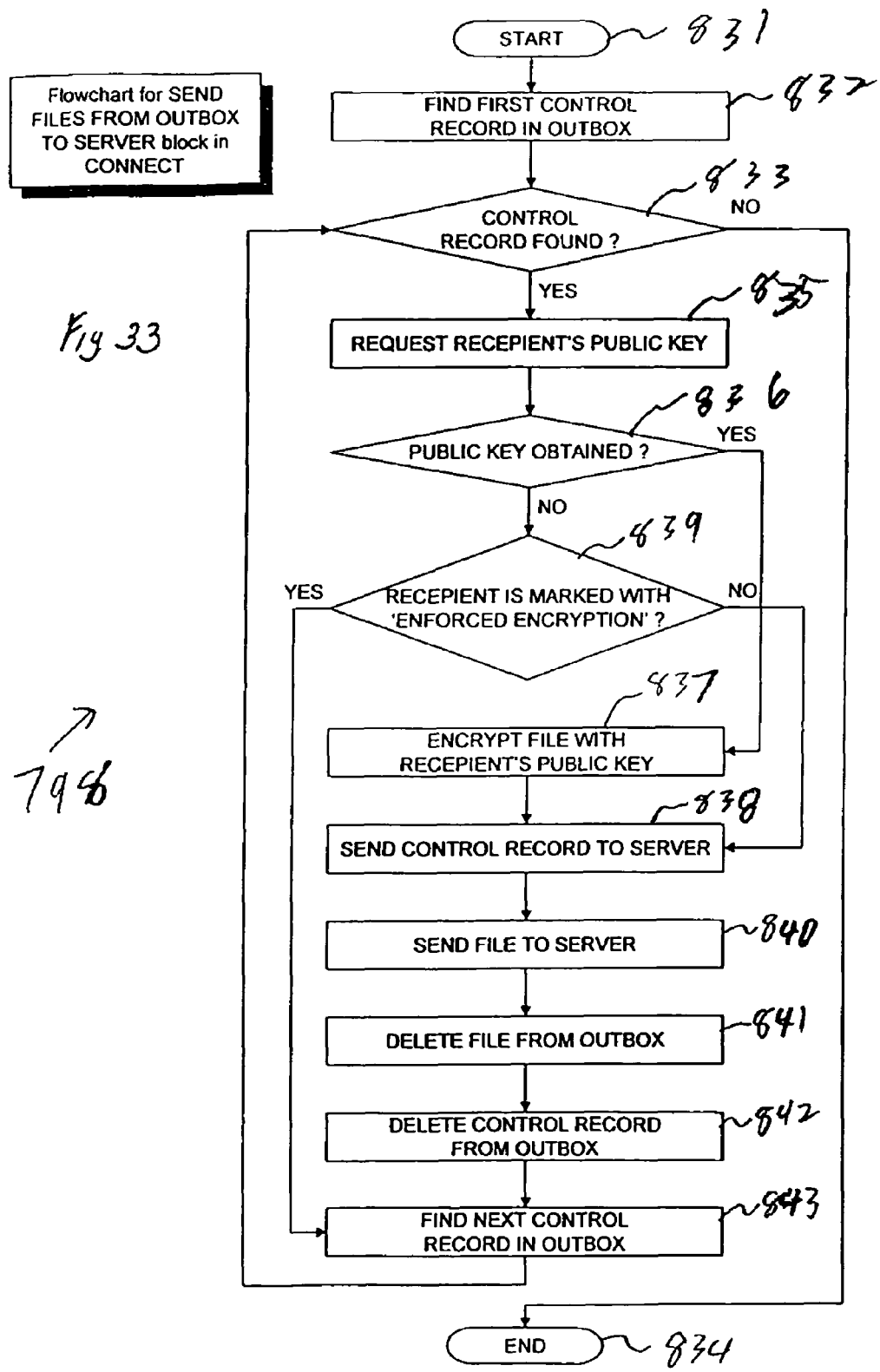

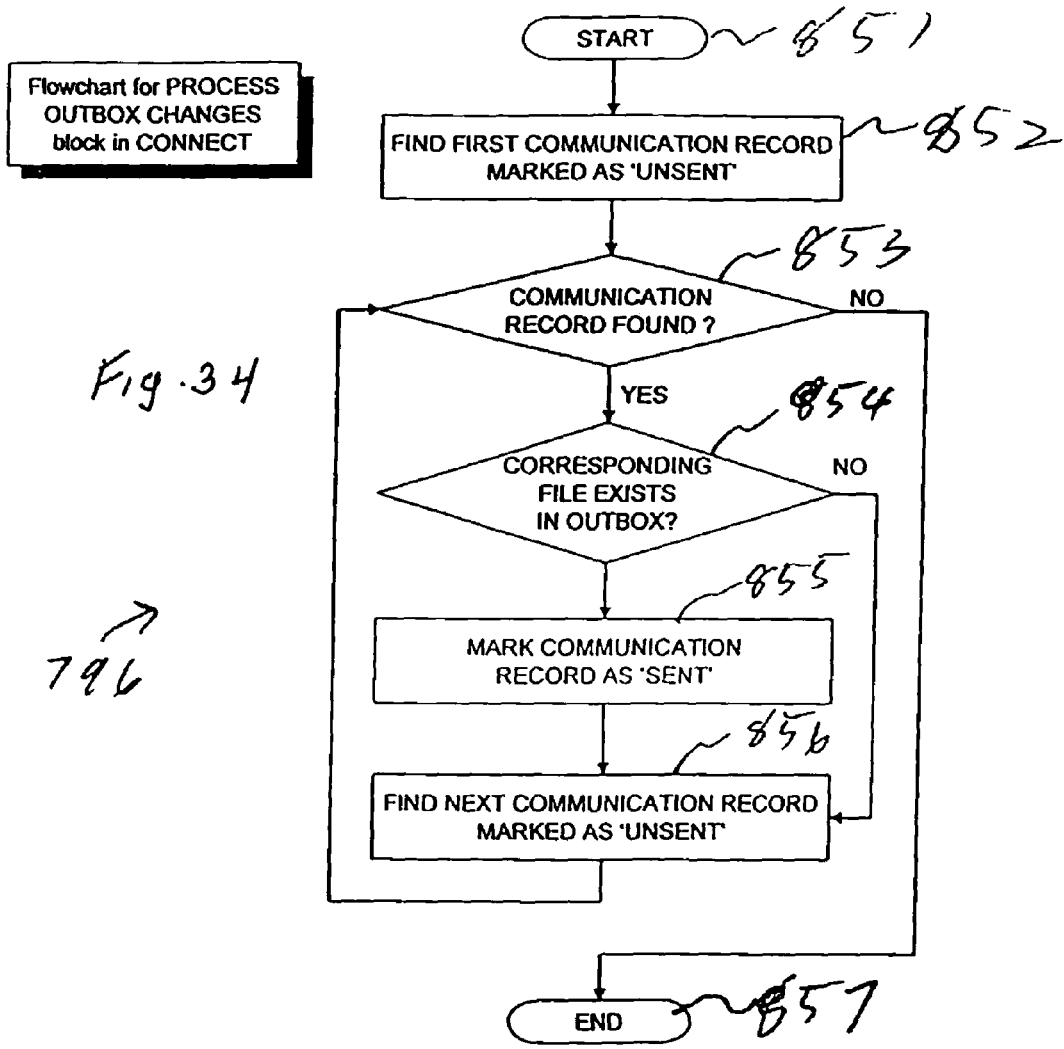

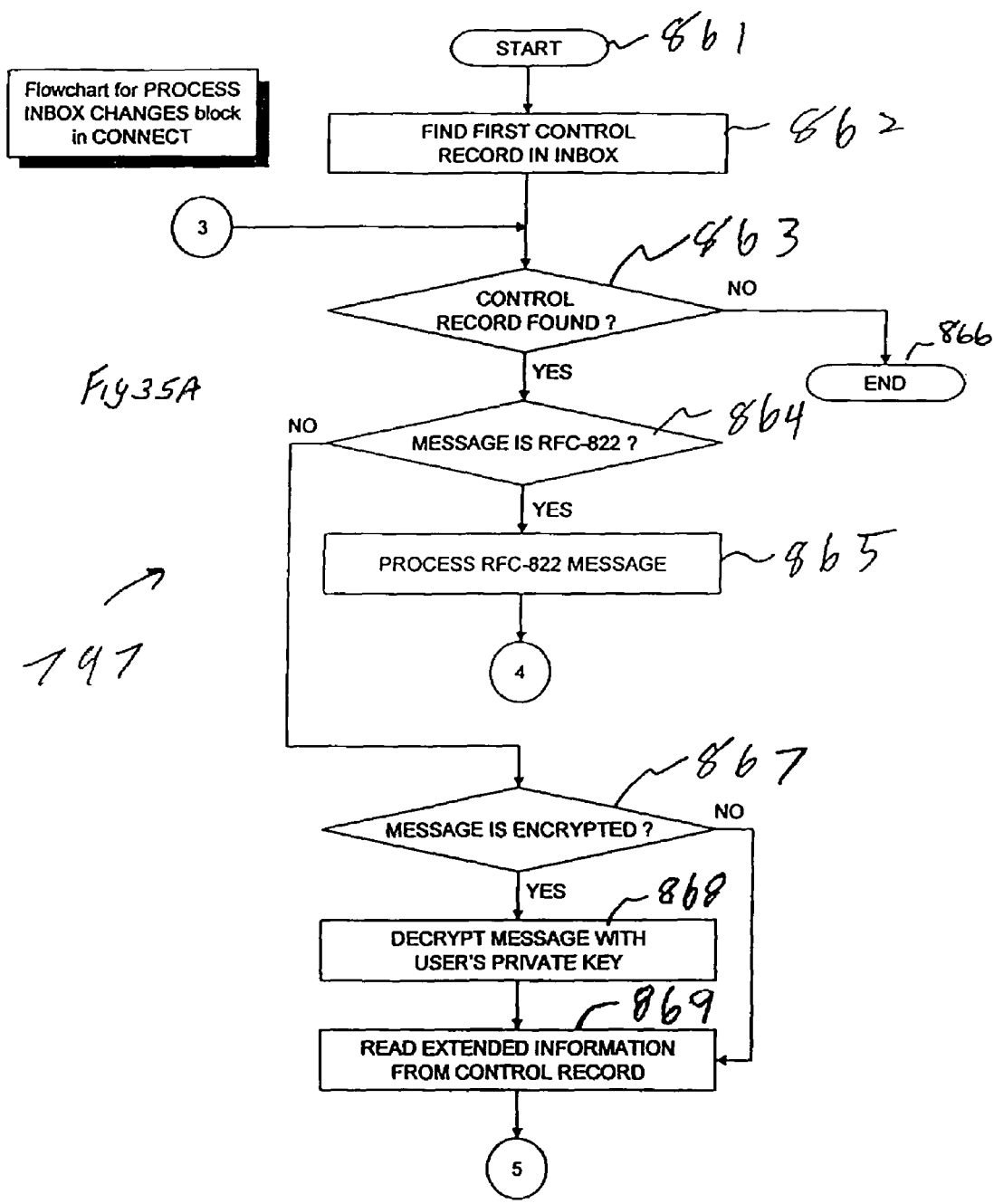

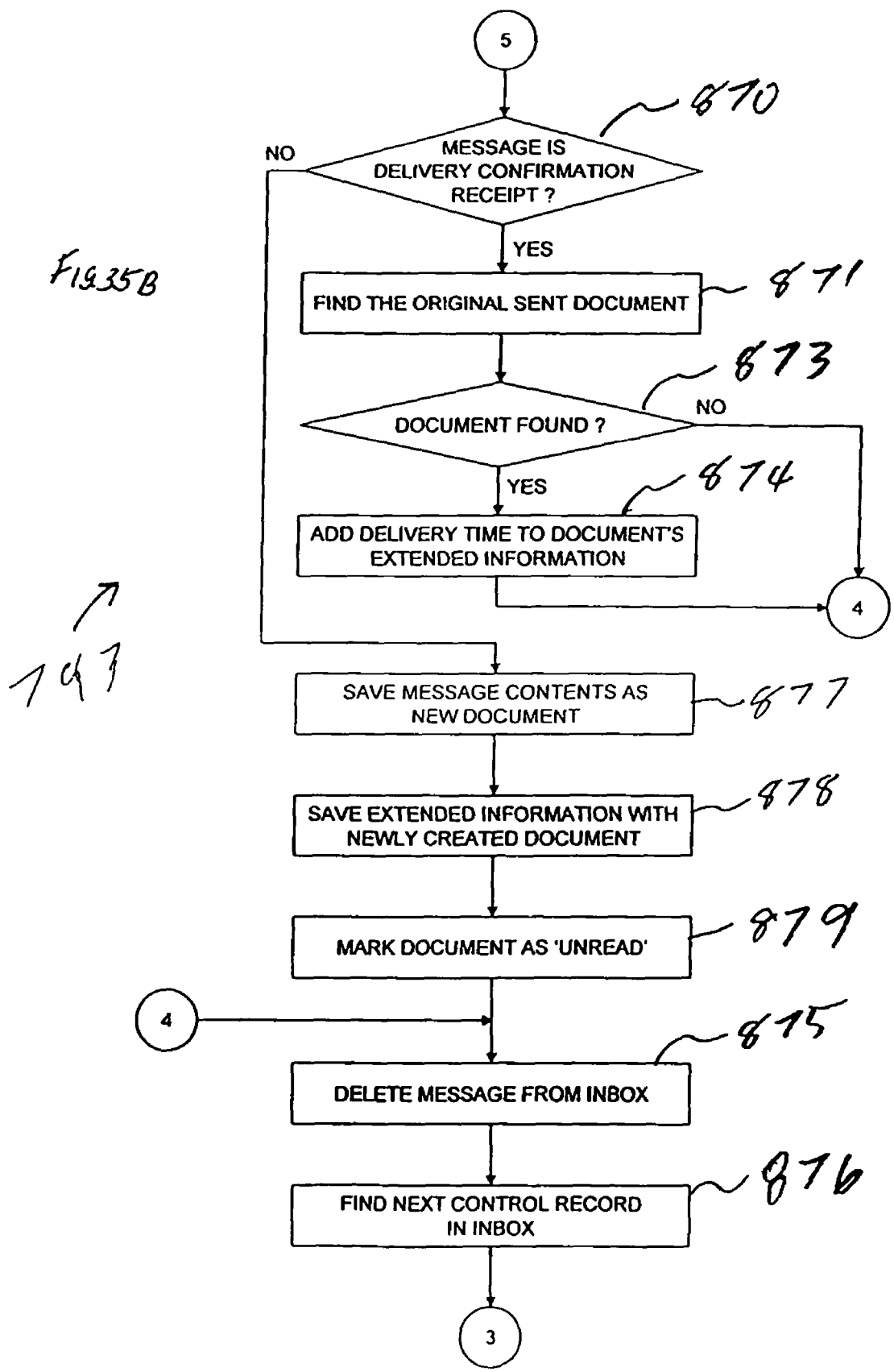

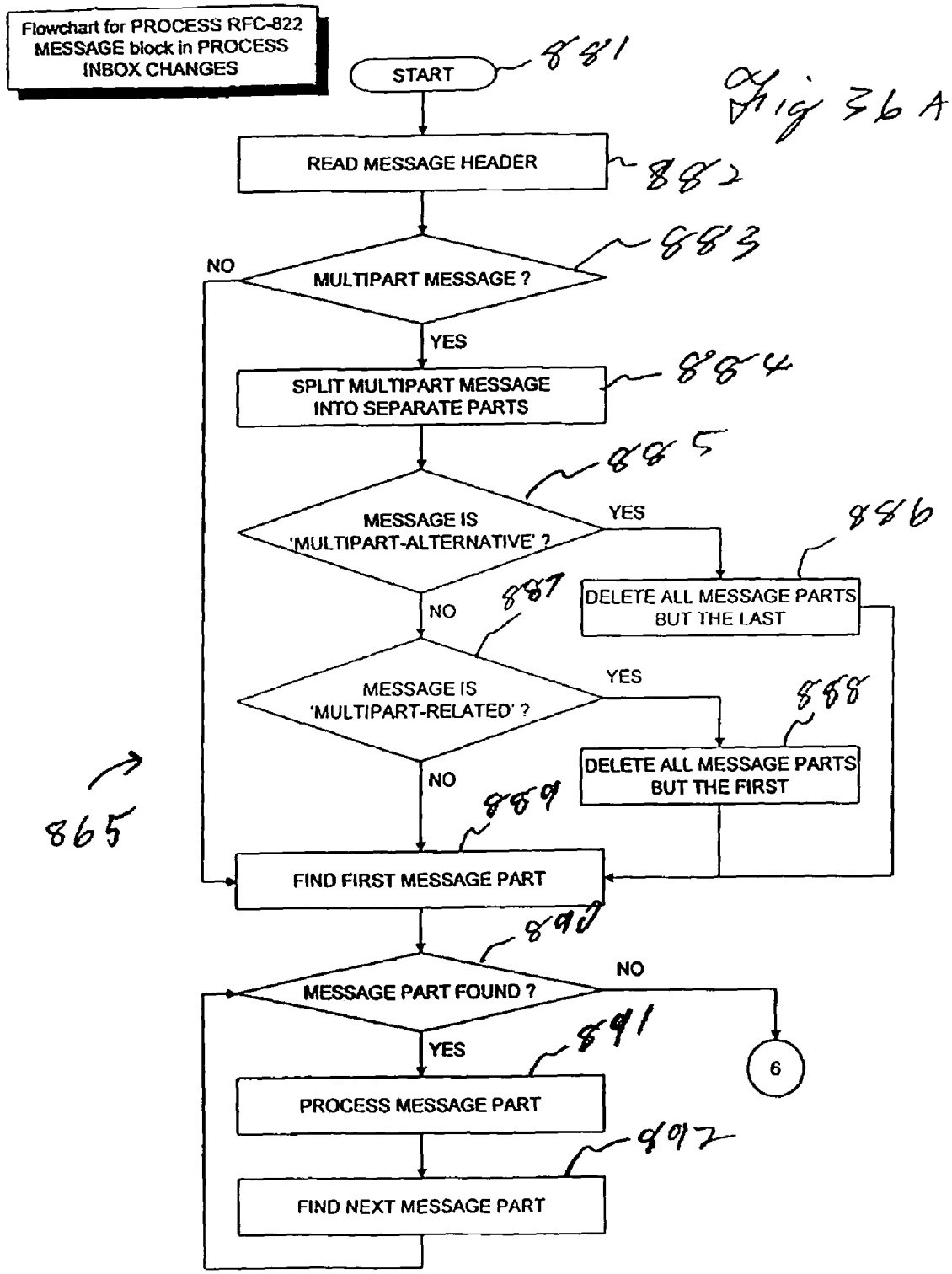

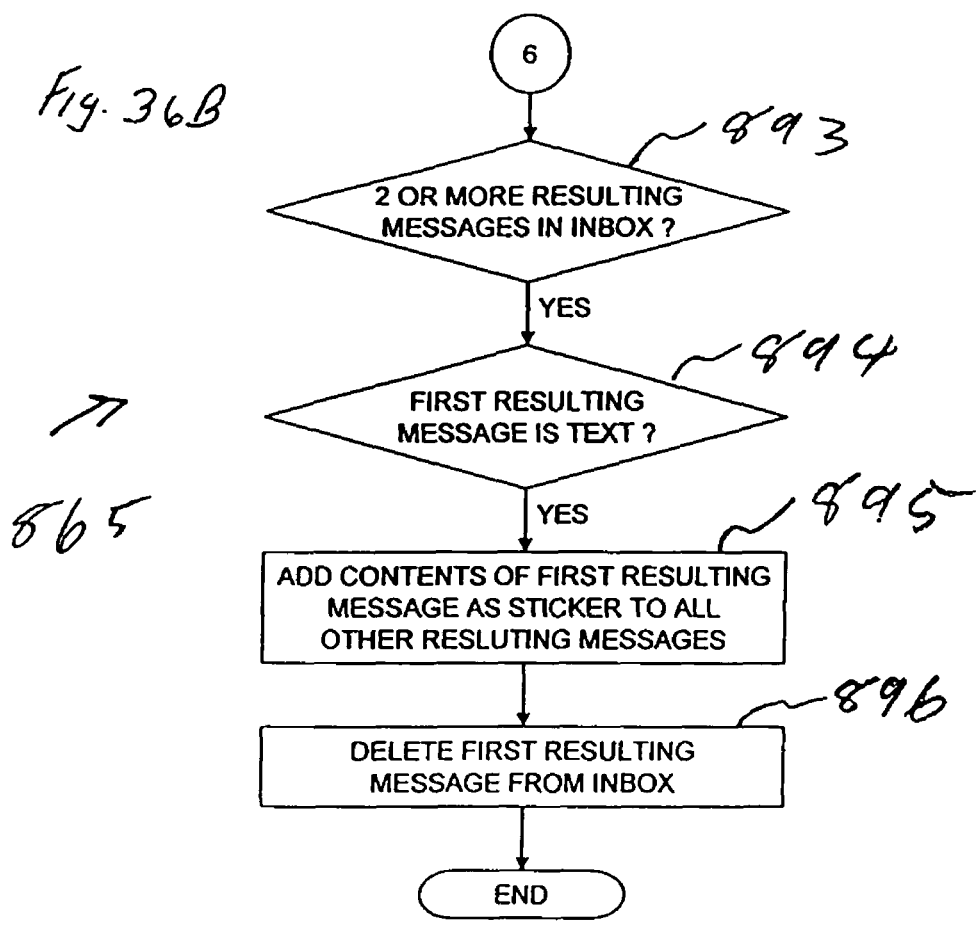

SYSTEM AND METHOD FOR ORGANIZING, MANAGING, AND MANIPULATING DESKTOP OBJECTS WITH AN ACTIVITY-ORIENTED USER INTERFACE

CROSS REFERENCE TO RELATED APPLICATION

This application is a continuation of U.S. patent application Ser. No. 09/908,983, filed Jul. 19, 2001, which claims the benefit of priority from U.S. Provisional Application No. 60/219,294, filed Jul. 19, 2000, the disclosures of which are hereby incorporated herein by reference.

FIELD OF THE INVENTION

The present invention relates to information processing system organization and in particular, to an interactive user interface to information processing systems. More particularly, the present invention relates to an activity-oriented user interface that allows a user to create and define customized groupings of several kinds of different objects created by information processing, communication and/or web applications, as opposed to the prior art of grouping like objects together in separate and distinct object groupings.

BACKGROUND OF THE INVENTION

A computer screen user interface provides the user with certain tools to organize the objects he or she is working with. The most common and typical way of organizing the objects in a computer is a hierarchical structure of directories or folders (hereinafter called folder structure). The user interface typically includes some default initial folder structure, which the user can eventually change by adding new folders and subfolders. Such default or user defined folder structure is used to simplify finding, retrieving and working with the objects, provided the user employs and memorizes certain individual conventions and rules, when the user creates, saves or moves the objects to certain folders or subfolders. Typically, the user tries to create and name folders and subfolders in such a way, that later, whenever necessary, it would be easier for him or her to understand, memorize or logically deduce, what kind of objects should be saved to or retrieved from, a certain folder. An example is the Microsoft Windows Explorer, which presents a folder structure and contents of each folder.

In addition to the folder structure, typically there is a special location, such as a desktop, root directory, special folder or location bar (hereinafter called desktop), to store most frequently used, new, temporary or uncategorized objects. For a reasonable number of objects, such locations provide a faster access for the user. Therefore, as the number of objects in such desktop grows, all but a limited number of the most frequently used objects should be eventually moved into the folder structure. The examples are Microsoft Windows Desktop, which can contain a certain spatially limited number of object icons, and the default My Documents folder in Microsoft Windows 95/98/2000.

In addition to the folder structure and desktop, some computer applications, software or programs (hereinafter called applications), provide their own default locations to store and retrieve user's objects, with or without folder structure, with or without user's capability to manipulate such folder structure, and with or without access to the general folder structure or desktop. In such cases the user has to organize his or her objects, using a separate set of rules and conventions, specific to such application, and in some cases an additional effort is needed to find, retrieve and work with these objects, other than through such particular application, if it is possible at all to do so. In addition, some applications allow access to the general folder structure for some types of objects, but not for the others. An example is Netscape Messenger, all versions up to the present date, which, for storing email messages, provides its default folder structure, which can be manipulated by the user. Netscape Messenger allows saving some types of objects, such as attached document files, but not the email messages themselves, in a general folder structure. Other examples are Netscape Navigator and Microsoft Internet Explorer, which allow storing the bookmarks or favorites respectively within a special folder structure, but not in a general folder structure.

There are several problems with the above prior approaches. In order to use Windows Explorer to organize objects, the user must be aware of it and learn about its features. Windows Explorer doesn't open automatically, and is merely included as one of many other components of the Windows operating system. Furthermore, Windows Explorer, once opened, doesn't clearly show the features of creating, renaming and manipulating the folders, those features being initially available from inside the cascading menus. As a result, many users, especially novices, cannot easily organize the objects they work with, and waste extra time and expend extra effort to find objects, sometimes unsuccessfully, and in general fail to use the computer in an efficient and convenient way.

In contrast, the Windows Desktop or default My Documents folder are presented very evidently in the user interface (the latter by being a default save location for some applications), and many users, especially novices, use them to store the objects. However, as mentioned above, eventually these locations become cluttered, and, without inherent hierarchical structure, inefficient in organizing the user's objects, as they grow in number.

Among the various types of computer usage, the most common for a computer user are: information processing (e.g. documents, files), communication (e.g. email, messages, contacts), web browsing (e.g. websites, bookmarks). Email clients and web browsers, which handle the second and third types of usage, do not use the same general folder structure-nor do they allow the user to organize the objects they generate into the same general folders—as are used with the information processing, with a few particular exceptions for some specific types of objects. Instead, the user is presented with a specific separate folder structure for each type of the object.

The email clients provide the user with two specific folder structures, one for the email messages, and another one for contacts and email addresses. The document attachments to email messages, however, can be stored in a general folder structure.

The web browsers provide the user with a specific folder structure for bookmarks or favorites. However, the individual bookmarks or favorites subfolders can be saved or copied to a general folder structure.

Not being able to use the general folder structure for all types of objects requires a user to create a multiplicity of several separate folder structures. In addition, a user must maintain and memorize separate folder structures in order to organize the most common everyday objects. Very often, these different types of objects relate to one activity, project, client, matter, etc. as categorized in the mind of the user. For example, if the user is working on a certain Project A, he or she very likely has a number of files and documents related to project A, plus a number of email messages related to project A, plus a number of email addresses for contacts involved in Project A, plus a number of Internet bookmarks for Project A. The prior systems and methods require the user to look for and work with these four types of objects in four separate and different folder structures. Even though the most organized of users may try to coordinate and conform the four different folder structures, every time the user looks for a different type of object, she still needs to access another folder tree, even if conformed. Typically, though, each of the four separate folder structures would be created at different times, and would contain more or less detail than the others, have different names for the folders and subfolders, and as a result, display a great deal of nonconformity in the different objects that are nonetheless related to the same user activity. Efficiency in processing different types of objects within the same activity demands the user to memorize several folder structures, their folder and subfolder names, and consistently follow rules and conventions for each in storing and manipulating the objects. As the number of activities, projects, clients, tasks grows, so does the burden and inefficiency in maintaining parallel folder structures.

In addition, inability to use the same folder structure for all objects of the same activity leads to other inefficiencies in using the computer besides an increase in file maintenance. For example, an email message with an attachment may contain at least three different types of objects: a contact name and email address; text message in the body of the email; and one or several attached files. Except for certain limited numbers of attached file types, which can be viewed inside the email (i.e. images, html documents), the attached files are opened by other applications, which files may be edited and then must be saved in the general folder structure, while the original email message remains in the email folder structure. This separation of the e-mail into different objects has several drawbacks that the present inventors have identified: (1) It is hard for the user to delete an attached file without deleting the text message, (2) Disk space is wasted by keeping two copies of the same attached file; one in the email client and one in the general file structure, (3) The general folder structure fails to contain information about senders/recipients of the attached file.

As referred above, a disadvantage of the prior email clients is that they indicate in their list of communications only the sender of the sent messages, instead of the recipient of the sent messages. In most cases, the sender of the sent messages is the user. A disadvantage of prior user interfaces is their drag-and-drop technique by which a user directs a mouse to move objects within the folder structure and the interface in general. A user has to keep the mouse button pressed while navigating the interface. If a user ceases to press the button during a command operation, he or she loses the ability to complete the operation and has to start all over. Such movement is ergonomically inefficient and taxing, especially to a user who moves objects within and across various folder structures.

The present inventors have perceived drawbacks to piecemeal approaches to the above problems. The present invention provides solutions, thereby giving the user advantageous ways to keep track of multiple sets of information, which otherwise would require additional physical and more complex effort.

SUMMARY OF THE INVENTION

Features

The present invention increases efficient use of user time and effort by providing an information processing system and method by which a user groups and accesses different kinds of objects related to the same activity together in a general user-defined folder. Specifically, the present invention provides a user interface that allows a user to group and access different kinds of objects together in a general user-defined folder. The different kinds of objects that may be placed together in and accessed from the same folder include: application files and documents; contacts such as address book entries, including e-mail addresses and fax numbers; communication files such as e-mails and faxes; web browsing objects, such as favorites or bookmarks; and web pages.

The prior art permits data files to be organized in a file structure. According to one aspect of the present invention, files containing activity-relevant email, URLs, documents and contact information are easily placed in a logical organization in the same directory folder, by which they are more readily associated with each other for retrieval and manipulation. The present invention lets a user store and access all of these functionalities and files directly through the same user interface so that each functionality is constantly available to the user. This is done without exiting the interface. In a particular embodiment of the present invention, manipulation of the files is accomplished without the need exit the interface in order to invoke separate program applications.

The methods of the present invention may be implemented in an information handling system, which includes one or more processors, memory, and input/output means. One of the embodiments of the invention is a set of instructions resident in an information handling system.

The present invention also provides an article of manufacture in the form of a computer-readable medium on which is stored a computer-readable software program capable of performing the foregoing method. Further, the present invention provides a computer system having preloaded therein a software program that allows a user to place different kinds of objects that he or she defines as related to the same activity together within a user-defined folder of a general folder structure. The computer system includes a processor and a display device coupled to the processor. The display device is used to display the user interface that allows a user to place different kinds of objects related to the same activity together within a user-defined folder of a general folder structure. The computer system also includes storage devices, such as a local or remote memory storage device, coupled to the processor. The memory storage device maintains the program module and data.

It is a feature of the present invention that application files, communication messages, email addresses and fax numbers of contacts, web bookmarks or favorites, and web sites can be stored together in and accessed from the same folder of the activity-oriented interface.

It is also a feature of the present invention that communications containing attachment(s) are separated on arrival to the recipient into a text message file and attachment file(s), each attachment file bearing an indication of the sender and/or recipient. A further feature of the present invention identifies such attachments with a visible icon denoted as a sticker note, which indicates the subject of the email message that the attachment accompanied. Text message files and attachment files are also annotated with the specific date and time received or sent. In this way, the user can relate and group within the general folder structure email messages with their attachments and yet is still able to process and perform operations on the attachments without having to so process the email messages.

It is also a feature of the present invention to provide visible icons by which the user can create and rename user-defined folders of a general folder structure into which the user may store together application files, communication messages, email address and fax numbers of contacts, web bookmarks or favorites and websites. The visible icons provided by the current invention presents a powerful user interface that displays a user's own folders, which a user creates to organize and group files and correspondence, along with shortcuts to installed software applications and to the utilities of the software of the present invention.

It is an important feature that the present invention couples the above features with a private email server. In so doing, a user, using the email functionality resident in a software program of the present invention, may send and receive emails directly within the user interface of the present invention upon connecting to an Internet Service Provider (ISP) of choice. Alternatively, a user may continue to send and receive emails from a server other than the private server, which is connected to the user's ISP server.

Coupled to the compound features of email functionality and the direct access of different kinds of objects within the same user-defined folder is a feature that provides automatic encryption and decryption in handling a user's email messages, both transparent processes to the user. Additionally, encrypted files are compressed. Once the encryption module of the present invention is configured by the user, the user does not have to deal directly with encryption keys setup or management and is thereby freed from learning the encryption software.

The present invention also features automatic archiving of files or messages left by the user in the general desktop folder at the end of a work session.

In addition, an important feature of the present invention is a pick-and-drop technique by which a user moves objects within the activity-oriented interface. In a "pick-and-drop" technique, a user clicks a mouse button once to select an object or objects, moves the object(s) around the interface without having to keep a mouse button continuously depressed, and then drops the object(s) where needed by pressing a mouse button once again, which action de-selects the object(s). With this feature, a user, with a minimum of mouse clicks, may open a file, copy it to a different location, fax or email it, depending on the context. Using the pick-and-drop technique, a user may send a message by dropping the message onto any contact name that is displayed within the same folder. Further, a variant of the pick-and-drop technique may be used to save web links or web pages, to "drop" them to a contact file or to send them to a contact.

Moreover, the pick-and-drop technique is well-suited for use with portable and handheld computerized systems in that it allows a user to execute commands and operations with a trackball and touchpad with greater precision.

Advantages

It is an advantage of the present invention that files and/or communications in various forms, such as e-mails and faxes, can be sent to the contacts listed in the same folder of the activity-oriented interface. It is a further advantage that all communications have a smart indication of a sender for the received files, and a recipient for the sent files.

A further advantage is that an implementation of the present invention not only allows a user to avoid excessive clicking on a mouse but also does away with double clicking. Importantly, for those users relying on a mouse, the user no longer needs to continuously depress a mouse button to keep the object selected during the dragging of an object. Unlike dragging a selected object, performing an operation involving a selected object in the present invention may be interrupted (such as by a telephone call) and then may be continued. The greatly reduced mouse clicking of the present invention carries a strong ergonomic advantage in reducing injury due to repetitive stress injury. The present invention solves a problem not solved by the prior art by allowing a user to work separately on email messages and their attachments, without leaving the same activity folder. Therefore, it is an important advantage of the present invention that a user may receive, amend, add to, move and/or send an attachment from within the same activity interface without having to access different folder structures of various applications first.

It is an advantage of the present invention that various objects left accumulated in the general desktop folder at the end of the last working session will be automatically placed into a general archive folder and are either retrievable by subject, sender/recipient or date and movable back to either the general desktop folder or any old or new folder, or may be deleted.

A further advantage is that, for users traveling with a portable computing system who need to store and maintain various kinds of objects while on the road, the present invention facilitates synchronization of files. By maintaining all the different objects a user may need to use on the road in one folder location, known and defined by the user, the present invention makes copying between computing systems or devices less burdensome as well as creates identical folders on different computing systems or devices, thereby reducing loss of information and maximizing efforts spent on file maintenance.

These and other objects, features and advantages of the present invention may be more clearly understood and appreciated from a review of the following detailed description of the disclosed embodiments and by reference to the appended drawings.

BRIEF DESCRIPTION OF THE DRAWINGS

FIGS. 15A-15C are diagrams showing a "process user input operation" used with the client program of FIG. 13.

FIG. 18 is a diagram showing the "contact" routine used with the sequence of FIGS. 15A-15C.

FIGS. 19A-19B are diagrams showing the "open" routine used with the sequence of FIGS. 15A-15C.

FIG. 33 is a diagram showing a "send files from outbox" used with the "connect" operation of FIG. 32.

FIG. 34 is a diagram showing a "process outbox changes" operation used with the "connect" operation of FIG. 32.

FIG. 35A-35B are diagrams showing a "process inbox changes" operation used with the "connect" operation of FIG. 32.

FIG. 36A-36B are diagrams showing a "process RFC-822 Message" operation used with the "process inbox changes" operation of FIGS. 35A-35B.

DETAILED DESCRIPTION

Definitions

Object. A current paradigm used for designing and implementing the present invention into a software program is object-oriented programming, which defines and packages objects. An object consists of a data structure plus the operations available for that structure. Once objects are defined, it is possible to build a program as a simple sequence of processes to be performed on specified instances of the objects. An integral part of object definition is the ability to create new, more elaborate objects as enhancements of those previously defined.

Activity. A user-defined class of related files whereby a user lumps together different categories of information stored and accessed from different files into a conceptual whole and classifies the whole as a project, task, operation, etc. An activity is a user-defined folder that contains related files which were each not created from the same application programs.

Activity-oriented interface. A user interface, which may be icon- and/or menu-based, by which a user can create, manipulate, store and access various kinds of program application files from within the same folder.

General folder structure. The most comprehensive arrangement of hierarchically nested folders so that all folders are contained and organized within. The folder is part of the directory structure, known as a tree directory structure. Therefore, for the purposes of this description, a folder is the equivalent of a directory. Each folder or directory may contain one or more files and may contain one or more folders or subdirectories.

Operating Environment Variations

Figure 1:
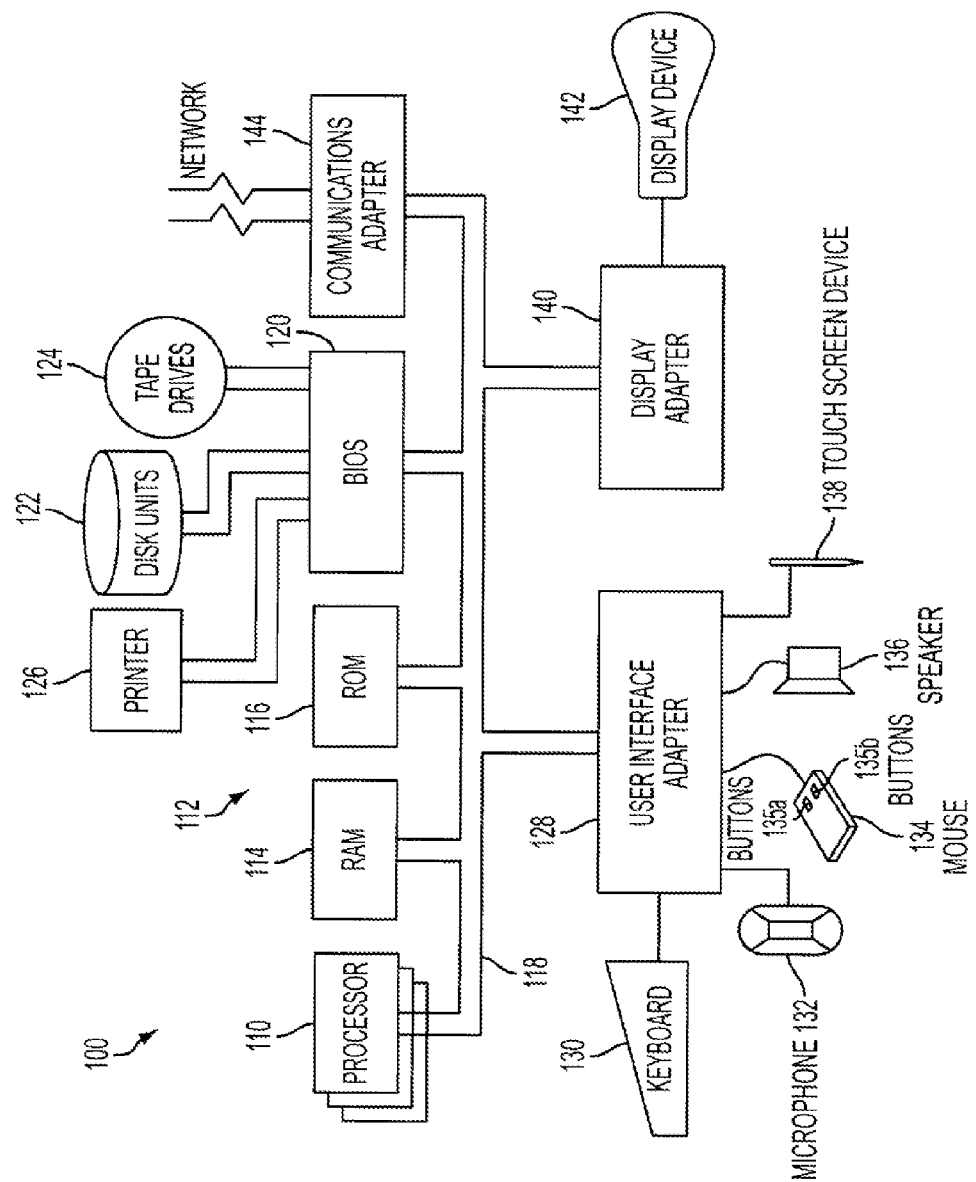
FIG. 1 is a block diagram of an information handling system that provides the operating environment for an exemplary embodiment of the present invention.
Figure 2:
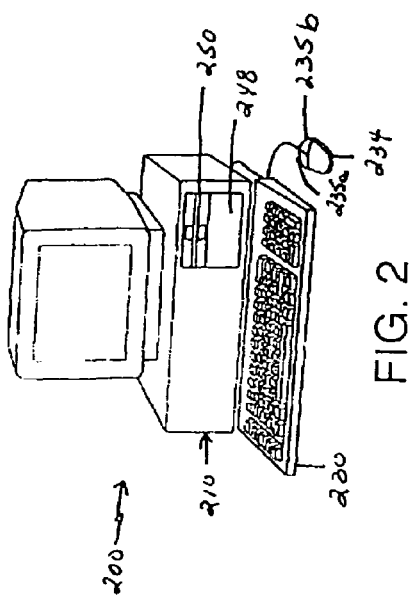
FIG. 2 is a block diagram of a typical personal computer system comprising processor, keyboard, mouse, and display with a computer-usable medium, such as a magnetic disk, for storing a program capable of performing the method of the present invention.

The following discussion together with FIGS. 1, 2 and 3 briefly describe an example of a suitable and typical information handling environment in which the invention may be practiced. The invention is described hereinbelow in the context of an application program that runs on an operating system in conjunction with a personal or business computer processor. Nonetheless, those skilled in the art will be aware that the invention may be practiced in combination with other program modules, such as routines, programs, components, etc. that perform particular tasks. Further, those skilled in the art will recognize that the invention may be practiced with computerized systems other than that described hereinbelow, such as hand-held devices, multi-processor systems, programmable consumer electronics, minicomputers, and mainframe computers, as well as in distributed computing environments in which remote processing devices are linked through a communication network to perform tasks.

With reference to FIG. 1, a typical example of an information handling system 100 for implementing the present invention includes at least one processor 110, a system memory 112, which includes Random Access Memory (RAM) 114 and Read Only Memory (ROM) 116, and a system bus 118 that couples the system memory 112 to the processor 110.

The system bus 118 also couples the basic input/output system 120 (BIOS) for connecting peripheral devices such as disk units 122, tape drives 124 and printers 126 to the processor 10. Moreover, the system bus 118 couples the processor 110 to the user interface adapter 128, which is connected to various user interface devices, such as keyboard 130, microphone 132, a pointing device such as a mouse 134 having buttons 135a and 135b, speaker 136, and touch screen device 138. Further, the system bus 118 couples the processor 110 to the display adapter 140, which is connected to a display device 142. For connecting the information handling system to a data processing network 146, the system bus 118 couples the processor 110 to a communications adapter 144, which may link the system of FIG. 10 with perhaps thousands of similar systems or devices, such as remote printers, remote servers, or remote storage units.

With continuing reference to FIG. 1 and now referring to FIG. 2, the present invention is typically implemented as an application program in an information handling system, such as a conventional personal computer system 200, comprising processor 210, keyboard 230, mouse 234 having buttons 235a and 235b and display 242. The hard drive 248 or storage device 250 contains computer program code that performs a method of the present invention preloaded or stored therein. As is well known, the user clicks a mouse button, or alternatively uses a touch pad, trackball or a touch sensitive screen, to supply input signals that move a cursor visible on the screen (or that lights up portions of the selected display). By moving the cursor over the icons shown on the screen, the user can perform desired tasks in the methods of the present invention.

The present invention may also be practiced by an article of manufacture using a computer-usable medium, such as a floppy disk or a CD-ROM, containing computer-readable program code configured to cause the computer to perform a method of the present invention as explained hereinbelow.

Figures 3A, 3B, 3C:
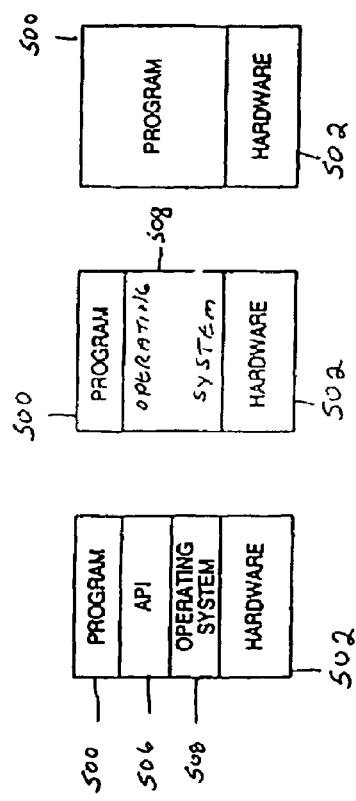
FIGS. 3A-C are block diagrams showing various ways for software program code that performs a method of the present invention may interface with the hardware of a computer system.

The information handling system 100 of the present invention or the method of the present invention or the article of manufacture of the present invention comprises in part a computer program code 500 that interacts with the computer hardware in one of several possible ways. FIG. 3A shows one embodiment of the present invention wherein the computer program code 500, executable by the computer processor 110, interfaces with an application program interface (API) 506 which interfaces with an operating system 508 which then interfaces with the hardware of the computer 502, typically the processor, memory and hard disk drive. The operating system can comprise be virtually any of the well-known ones, such as a version of Windows (Microsoft Corporation), MacOS (Apple Computer), or UNIX or Linux, or any other operating system appropriate to the pertinent hardware and firmware, and having a known API.

Alternatively, FIG. 3B shows the computer program code 500 interfacing directly with an operating system that is able to directly interface with the computer hardware 502, such as a version of Windows operating system, (Microsoft Corporation) or a version of the Unix operating system. Further, FIG. 3C shows the computer program code 500 incorporating the necessary operating system elements, so that it may interface directly with the hardware 502. In yet another embodiment, the computer program code 500 could be written in a hardware-independent language, such as JAVA (Sun Microsystems) or JavaScript (Netscape Communications Corp.).

Figure 4:
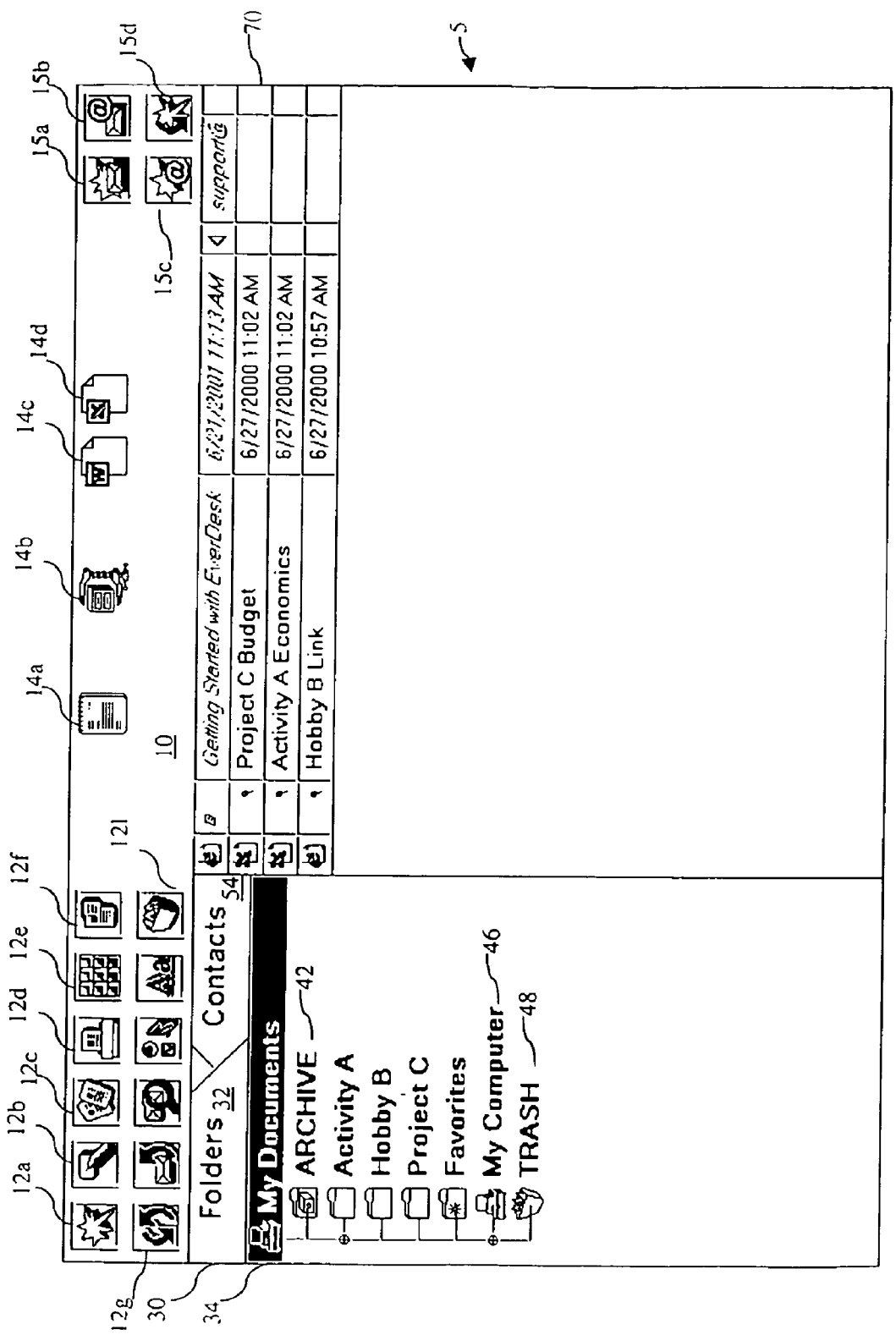
FIG. 4 is an image generated by computer program code performing a method of the present invention on a display showing the opening screen of the program.

FIG. 4 shows a display 5, which is the output of the display device 142 and which interfaces with a user. The screen real estate of the display 5 is organized into several functionality areas, including a Program Area 10, a Folders/Contacts Tabs Area 30, a General Folder Structure Area 36, an Arrows Area 70 and a Workspace Area 90.

The Program Area 10 comprises at least two kinds of icons: a plurality of first icons 12a-l and a plurality of second icons 14a-d. Each of the first icons 12a-l is a graphical representation of an individual utility function. Icons 12a-l in the Program Area represent the following functions: Create 12a by which a user may create a new file, folder or address book group; Rename 12b by which to rename a file, folder or address book group; Duplicate 12c by which to create a copy of a file or address in the same folder; Print 12d by which to print a file; Assign Color 12e by which to attach a color code to a file or address; Attach Sticker 12f by which to attach a sticker note to a file or address; Send & Receive 12g by which to connect to a server and to send and receive email messages; Reply to Mail 12h by which to send an email message to the sender of a previously received message; View With Address 12i by which to view files sent or received from a selected address; Configure Program 12j by which to establish setup parameters for connection to a private server and for automatic, transparent encryption and decryption of sent and received e-mails; Configure Fonts 12k by which to set up fonts used in the interface; Delete 12l function by which to put files or folders into a "trash bin" and to delete addresses, groups or program icons.

Each of the second icons 14a-d in the Program Area 10 is a graphical representation of a shortcut to a program application. This is illustrated hereinbelow in a Windows (Microsoft Corporation) environment. Shortcuts to applications function in a Windows environment by loading and invoking the selected application. The user may place into the Program area those application shortcut icons that he or she commonly uses. FIG. 4 shows examples of the following shortcut icons: 14a for Microsoft Notepad; 14b for WinZip; 14c for Microsoft Word, and 14d for Microsoft Excel.

Four email functions 15a-d are provided in the Program Area 10. These are Compose 14a, Send 14b, Add to Contacts 14c and Delete 14d.

The Folders/Contacts Tab Area 30 comprises two tabs: a Folders Tab 32 and a Contacts Tab 54. FIG. 4 displays the Folders Tab 32 selected. When the Folders Tab 32 is selected, a My Documents Area 34 displays the General Folder Structure 36 shown in FIG. 11, when the Contacts Tab 54 is selected, an Address Book Area 56 is displayed.

FIG. 4 shows an exemplary default organization of the General Folder Structure 36, which contains all applications, icons and objects available to the user on the computing system 100. As shown, the General Folder structure 36 includes the following specialized object locations or folders: ARCHIVE 42; My Computer 46; and TRASH 48.

Also shown in FIG. 4 is the Workspace Area 90, which displays the files and contents of a folder in the My Documents area 34 that has been highlighted and an Arrows Area 70, which organizes the Workspace Area 90 into fields 70a-f that identify certain properties of the files.

FIG. 4 shows output from a display device without indicating a particular hardware-software configuration or operating system environment as discussed in reference to FIG. 3. Although FIGS. 5-11 shows output from a display device wherein a software program of the present invention is running within an exemplary operating system environment, herein Windows, the invention as disclosed in FIGS. 3A-C may be practiced within any hardware-software configuration and from within any suitable operating system.

Figure 5:
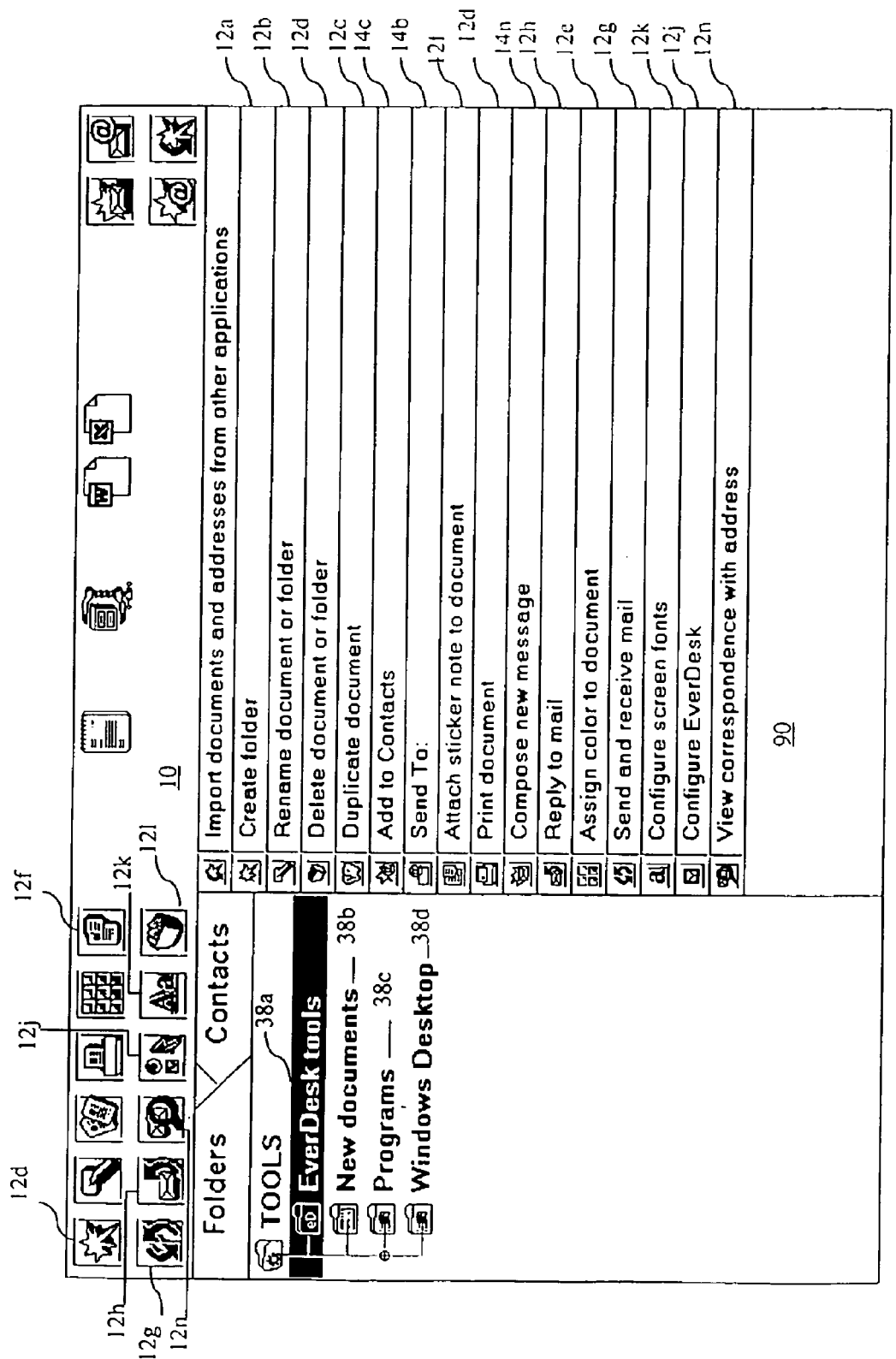
FIG. 5 is an image generated by computer program code performing a method of the present invention on a display showing computer program tools and icons available to the user.

Referring now to FIG. 5, the output shows an opened TOOLS folder 38, which comprises the following folders: Program tools 38a, New Documents 38b, Programs 38c and Windows Desktop 38d. The program tools 38a are tools associated with the inventive program. FIG. 5 shows the program tools folder 38a highlighted and the Workspace Area 90 displaying the contents of the highlighted folder 38a. The program tools folder 38a contains the same icons and corresponding commands 12a-l that represent program utilities as are displayed in the Program Area 10 and as discussed with reference to FIG. 4. Also appearing in the program tools folder 38a are email icons 14a-c. The email Delete icon 14D is not in the program tools folder 38a, but can be invoked from other menus as desired. A user may click on either a corresponding command 12a-l in the Workspace Area 90 or an icon in the Program Area 10 to accomplish the same set of utility functions.

Figure 6:
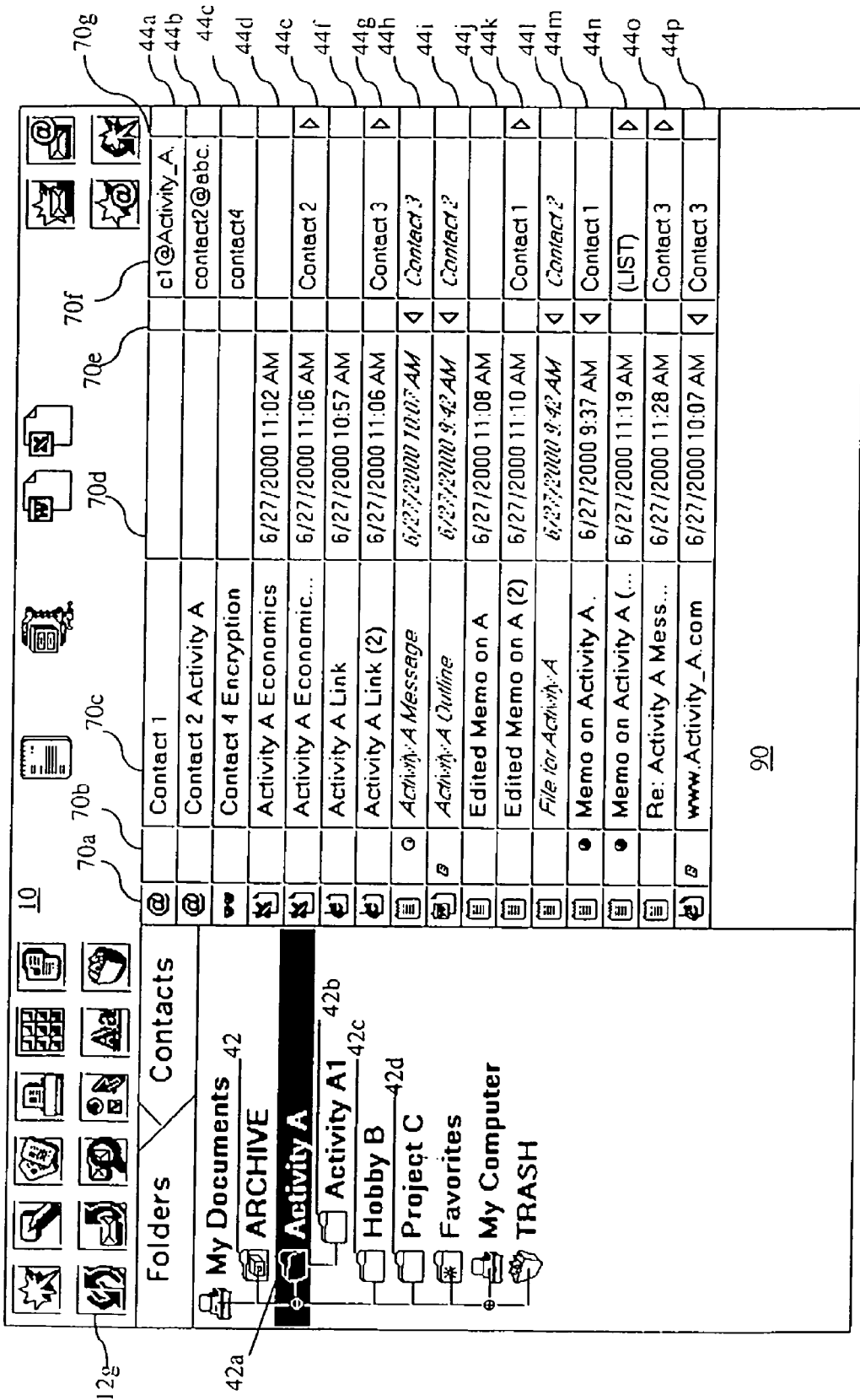
FIG. 6 is an image generated by computer program code performing a method of the present invention on a display showing an activity-oriented interface folder containing different types of user objects.

FIG. 6 shows an activity-oriented user-defined folder containing different types of user objects or files. Specifically, FIG. 6 shows that opened ARCHIVE folder 42 contains four user-defined folders: Activity A 42a; Activity A1 42b; Hobby B 42c and Project C 42d. Each of folders 42a-d represents exemplary activities, projects, tasks, etc. defined by a user. Activity A folder 42a is shown highlighted and its exemplary contents are displayed in Workspace 90 as files 44a-m. Particularly noteworthy is that Activity A folder 42a has stored within it the following various kinds of files, which may be accessed by a user: Microsoft Notepad files —44a, 44c, 44e, 44j through m; Microsoft Word document —44b: Internet web page: 44e; Microsoft Excel files: 44g & h; e-mails —44f & i.

FIG. 6 also displays the various icons used within fields 70a-g of Workspace 90. In field 70a icons indicate the application that the file is associated with. In field 70b, icons indicate whether a user has attached a sticker note to the file or color-coded it. Field 70c displays the user-assigned file name. Field 70d displays the date and time when the field was created (e.g., files 44f & 44g) or sent (e.g., file 44i) or received (e.g., files 44b & 44c). In field 70 e, the icon indicates that the file was received into the Activity A folder 42a; when clicked on, the icon in field 70e displays the e-mail address of the sender of the file (not shown). Files received into the Activity A folder 42a include files 44a-44e, whereas files sent out of Activity A folder 42a include files 44 h, 44i, 44 k-m. Field 70f displays the name of the sender or recipient of the file depending on how the file has been processed. Information in fields 70c, 70d, and 70f that relates to files 44b to 44e is shown in italics, which indicate that these files have not yet been opened. In field 70g, the icon indicates that the file may be sent or has been sent outside the file folder, here Activity A folder 42a. When the icon in field 70g is activated, the e-mail address of the recipient of the file is displayed (not shown).

Figure 7:
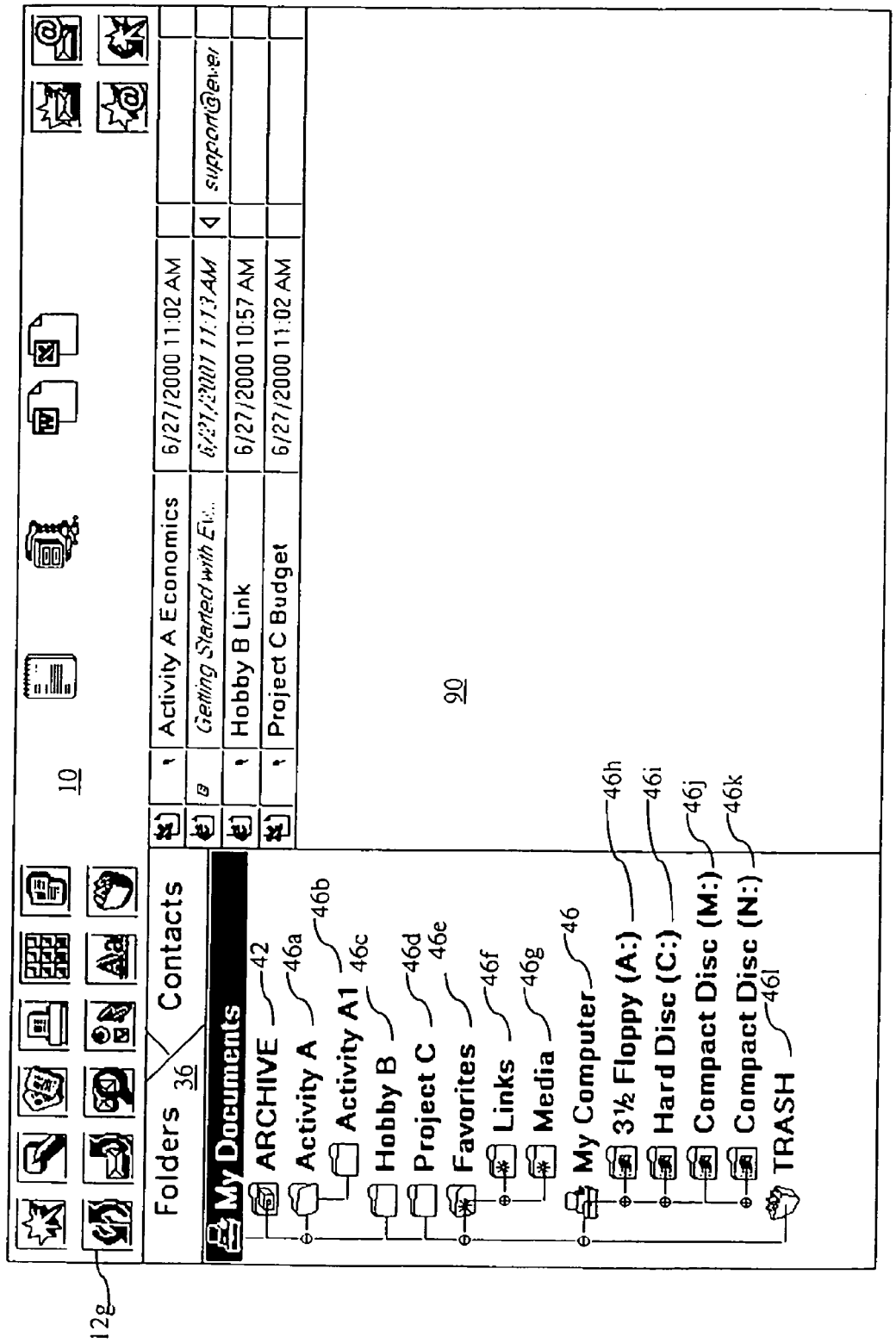
FIG. 7 is an image generated by computer program code performing a method of the present invention on a display showing interface elements, including top desktop area, folders/contacts tabs, desktop folder and its contents, subfolders of the tools folder, archive folder, user activity folders, and general computer drives and folders.

FIG. 7 shows an opened My Computer Folder 46, located in the General Folder Structure 36. As shown, the opened My Computer folder 46 displays an exemplary My Computer file structure 60, used to identify storage locations of files saved on a storage medium, typically a disk drive or flash memory chip in a computing system. The My Computer file structure 60 as shown in FIG. 7 is for illustrative purposes only and may include any customary file structure suitable for the computing system used and adopted by those skilled in the art as well a more tailored file structure developed for a specific user.

Composing

With continuing reference to FIGS. 4-7, when a user desires to create a new file while using the method of the present invention, unlike with interfaces in the prior art, all he or she has to do is to open a desired folder in the My Documents area 34. The user is then presented in the Workspace Area 90 with a list of software applications that are currently available to the user from within the computing system he or she is using, either because the applications have been stored within the computing system or because the user has Internet access to them. When the user clicks on an application icon, that application is executed and a new document page for that application is displayed. The user may then create a new document for that application. All new documents are assigned a date and time when they are first created, which is always visible along with the assigned file name.

Storing Documents from a Variety of Applications

Once a new document has been created, a user may save it to a folder within the ARCHIVE folder 42 displayed in the My Documents area 34 of the software method of the present invention. The user saves a new document to an existent folder by activating or "picking" the file to be stored, which causes an icon to be displayed that indicates that the file has been selected. The user then moves the icon to the desired folder and then de-activates or "drops" the file by right-clicking onto the desired folder. This technique is called "pick-and-drop". A software method of the present invention employs this technique for saving, routing and transporting files.

A user may save a new document into a new folder. Creating a new folder is done by opening the My Documents area folder 34 and then activating the Create New Folder icon 12a in the Program Area 10. Once a new folder is created, a user can save a new document into it using the pick-and-drop technique.

All folders are stored in the ARCHIVE 42 folder of the My Documents folder area 34. Importantly, a user can save any new document created with any application accessible to the user's computing environment (either stored on a hard drive or network, or used directly from the Internet) into any folder in the ARCHIVE 42. A user is not limited to saving files created with one application into one ARCHIVE folder (see FIGS. 5 through 10). In practical terms, then, a user may create a new folder, naming it for a particular activity, task, work session, project, etc., and then save into that folder all files related to that activity, etc., regardless of which application they were created with. Thus, unlike software applications or operating systems in the prior art, the present invention actually permits a user to create a user-defined activity folder and to store different kinds of files—regardless of application type—into it, especially as shown in FIGS. 5 to 7.

Storing Electronic Communications

Figure 8:
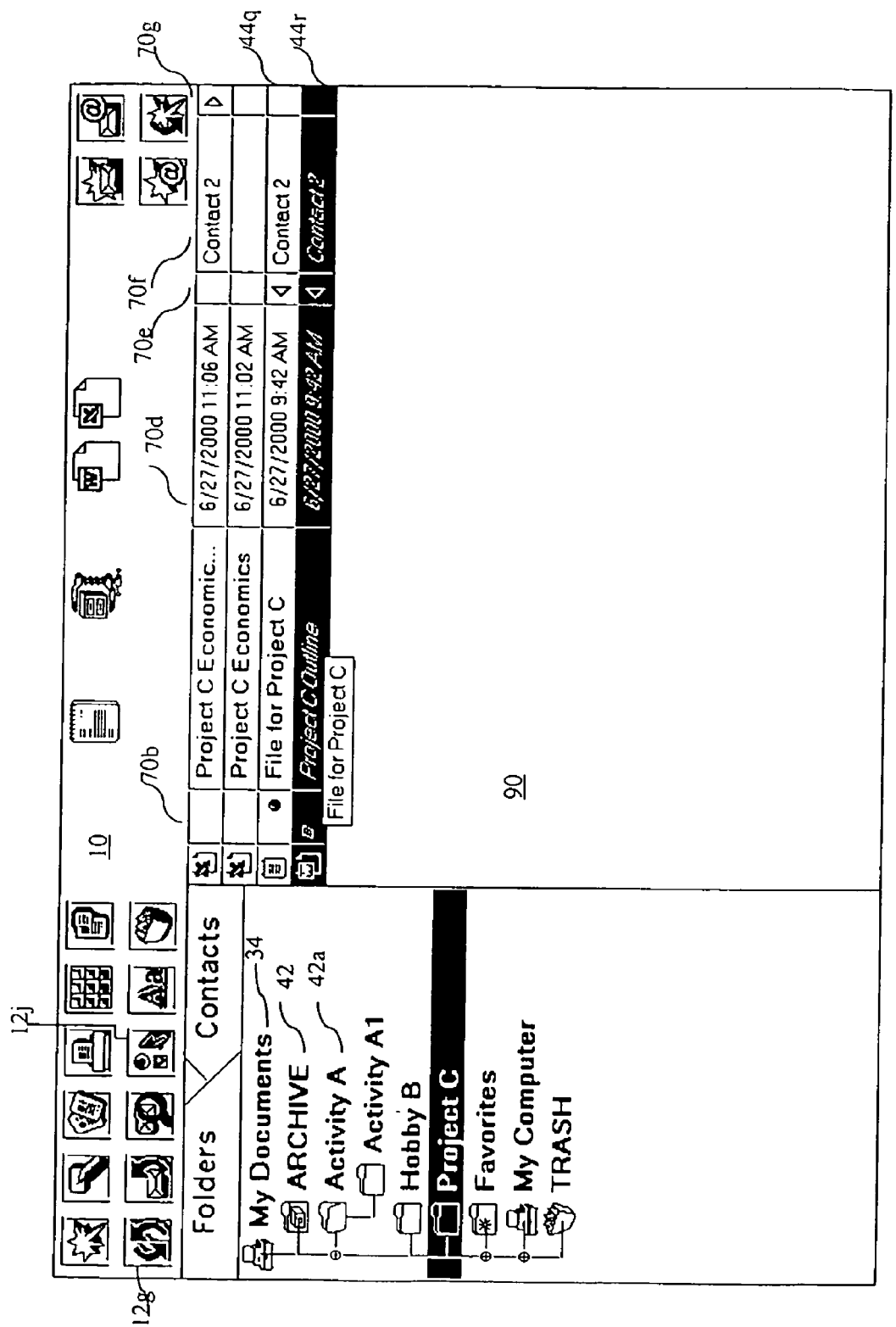
FIG. 8 is an image generated by computer program code performing a method of the present invention on a display showing an activity folder containing a received electronic communication, separated on arrival into a message and a file, and also showing an indication of a recipient for the sent communication versus a sender for received communication.

FIG. 8 shows a user-defined activity folder, Activity A 42a, that contains a received electronic communication that has been separated upon arrival by a software method of the present invention into an e-mail message and an attachment. In FIG. 8, the contents of opened Activity A folder 42a is shown listed in the Workspace Area.

Shown in FIG. 8 are two related files, 44q and 44r, which both show in field 70d that they were received at the same time. For attachments to e-mail messages (and for sticker notes placed in field 70b of any file), a user may position the cursor over the icon in field 70b to bring into view a message window that displays the name of the attached file (or the content of the sticker note attached to the file).

The present invention separates e-mail messages from their attached files upon arrival, while storing these two kinds of files within the same activity folder, which is not done by the prior art. A user, therefore, may process and access these two kinds of files from within the same activity folder.

Moreover, with continuing reference to FIG. 8, field 70f in Workspace 90 shows the name of the sender or the recipient of the file. The arrow icon in field 70e indicates the file was received; whereas the arrow icon in field 70g indicates the file was sent.

Sorting Electronic Communications

Figure 9:
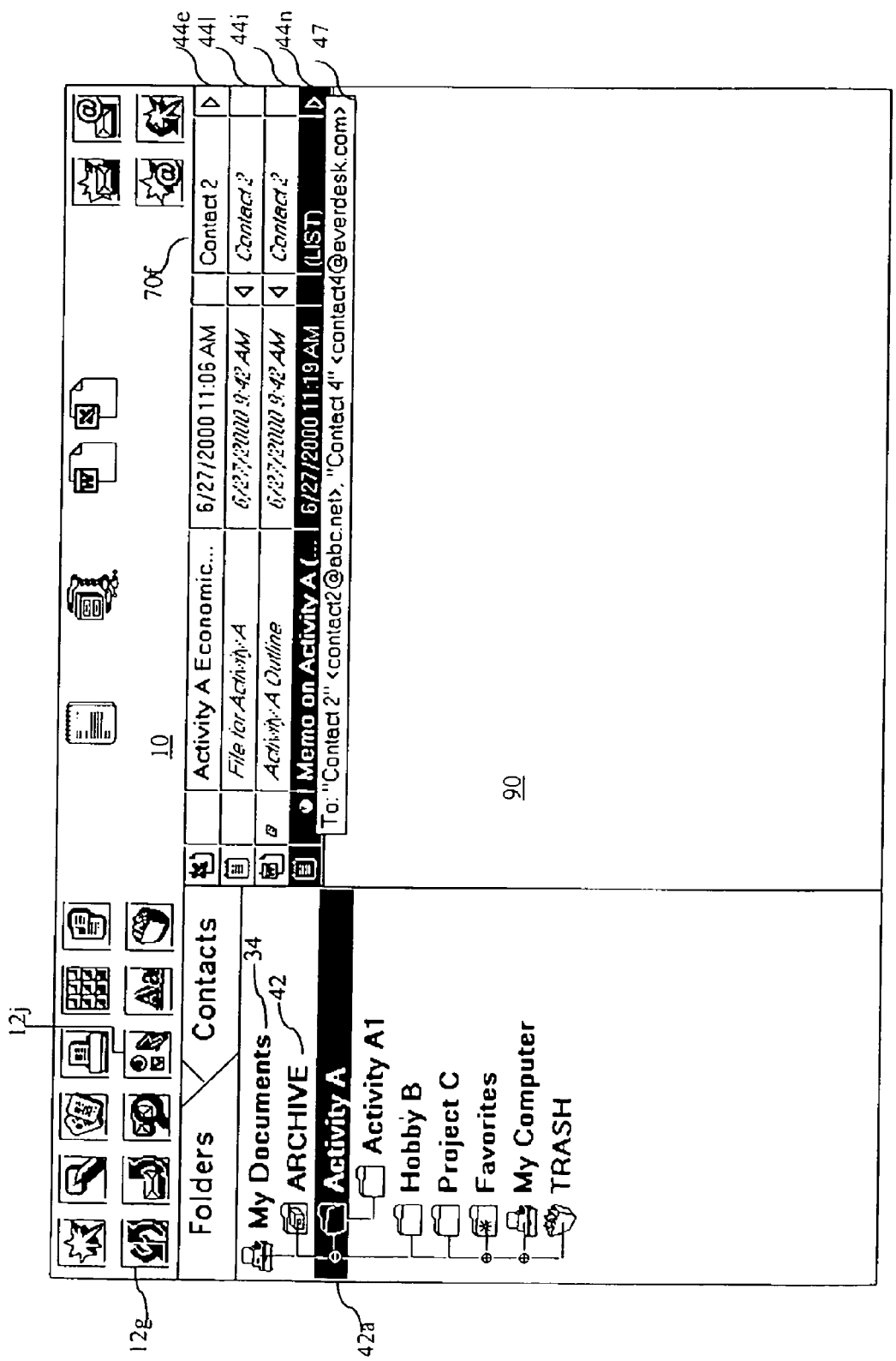
FIG. 9 is an image generated by computer program code performing a method of the present invention on a display showing an activity folder with all communications with a certain contact.

As shown in FIG. 9, a user, while working within a user-defined folder may sort the files displayed in the Workspace 90 to include only those communication files, i.e., e-mail messages and attachments, that contain a certain contact. In FIG. 9, the sort was limited to those files within an exemplary user-defined activity folder, Activity A folder 42a, that contain an exemplary contact, "Contact 2", in field 70f. Thus, FIG. 9 shows that subset of folders, 44e, 44l, 44i, and 44n, within user-defined Activity A folder 42a that contain "Contact 2" in field 70f. Highlighted in FIG. 9 is the file "Memo on Activity A ( . . . ", which displays in field 70f not a specific Contact name but a LIST, which indicates that the file has been sent to more than one Contact. When a user places the cursor on the icon in Field 70g of File 44n, a window message 47 is shown that indicates that the file has been sent to "Contact 2" and to "Contact 4".

Sending/Receiving Electronic Communications

With continuing reference to FIGS. 4-9, a user may receive an electronics communication by activating the Send/Receive Mail icon 12g in Program Area 10, which will cause a software method of the present invention to connect to a private communications server (so long as the user has configured a software method of the present invention beforehand to connect to a private server by activating the Configure Program icon 12j). Communication messages that the user has received from any of its registered PPP servers will appear in the Workspace Area 90 when the user activates the My Documents area 34 (so long as the user has configured a software method of the present invention beforehand by activating the Configure Program icon 12j). The user may then store any of the communications messages into a user-defined activity folder in the ARCHIVE 42 by picking (selecting) a message in the My Documents area 34, positioning the cursor over the ARCHIVE 42 folder of choice and then dropping (right-clicking) the message there. To reiterate, e-mail messages and their attached documents are received by a user as two separate files, so that a user may store, process and access them as separate files within the same user-defined activity folder.

A user may send a communication message in a similar manner as described above. A user first creates a text message in the My Documents area 34 and then picks and drops a contact name onto the message to indicate the address to which the message is being sent. (See the description of FIG. 11 hereinbelow). To attach a file, a user may pick-and-drop a file onto the message in My Documents area 34. A user then activates the Send/Receive Mail icon 12g to connect to a private server, which will send the communication message (so long as the user has configured a software method of the present invention beforehand by activating the Configure Program icon 12j).

Encrypting

Figure 10:
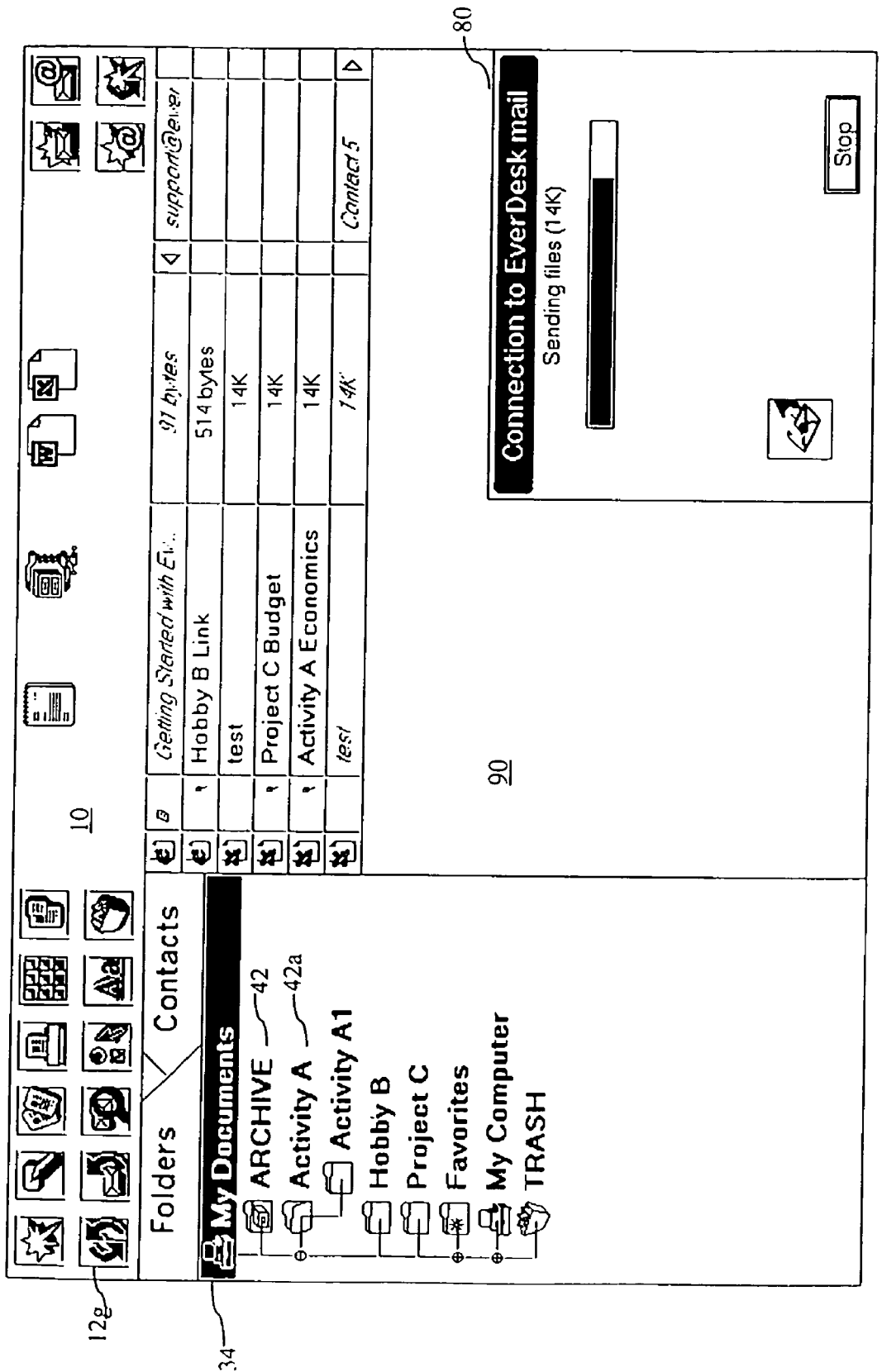
FIG. 10 is an image generated by computer program code performing a method of the present invention on a display showing indication of an encryption of an outgoing communication.

With continuing reference to FIGS. 8 & 9, FIG. 10 shows an output display for an encryption of a communication file stored in the same user-defined ARCHIVE 42 folder as shown in FIG. 8, titled Activity A 42a. An Encrypting Window 80 (also used for display of transfer) is displayed when a user sends an e-mail message via the private server, so long as the user has first activated the Configure Program icon 12j in the Program Area 10. A user configures a software program of the present invention by supplying the required information requested.

An Encrypting Window 80 conveys to the user that the file(s) being sent are being encrypted but the processes of encryption and decryption are actually transparent to the user, once configuration of a software program of the present invention has been completed. The user therefore does not need to learn the encryption software or maintain encryption keys.

In one embodiment, messages between the client and server are transmitted in a format in which message encryption is accomplished with file compression software. Therefore when a message is encrypted it's also compressed because the encryption algorithm compresses data. Examples of encryption software includes PkZip 2.04G sold by PkWare, and other PKZip compatible software. If a message is from one user of the program to another, then nothing else is done as far as encryption is concerned and the encrypted file is transferred, in encrypted form by the server from the sending client to the receiving client. If a message is from a program user to an internet address, then the server converts it to the standard RFC-822 format. MIME/Base64 encoding is used for non-textual data in one embodiment of the invention. Messages received from the Internet for program users are routed to the users without change, except for the transport envelope between the server host and the client. In this embodiment, the program uses two protocols for communication between server and client software; Secure HTTP (https) and a customized protocol.

Accessing Stored Files

The present invention also allows a user to access all the different kinds of application files stored into a user-defined, activity-oriented folder in the ARCHIVE folder 42. With continuing reference to FIGS. 6 to 10, a user may access documents and files created from different applications but stored within a single, user-defined activity-oriented folder with ease. For example, to access the stored files in Activity A folder 42a, a user would open the ARCHIVE folder 42 and activate the Activity A folder 42a, which appears as highlighted in the My Documents area 34. Shown in the Workspace Area 90 are the individual files 44a to 44p (FIG. 6) that are stored in Activity A folder 42a. As discussed above, these files are different kind of objects created from different applications.

Address Book Functionality

Figure 11:
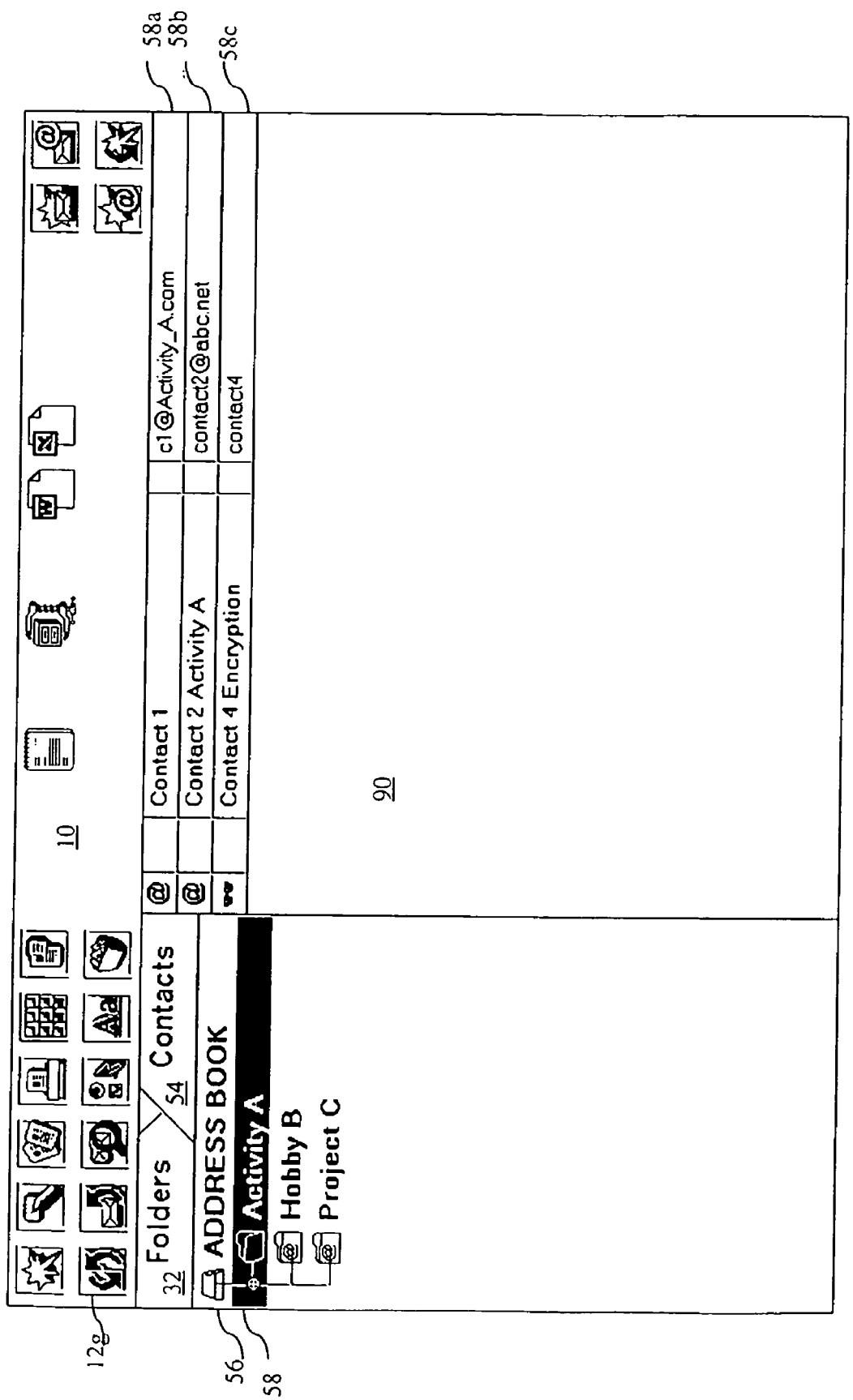
FIG. 11 is an image generated by computer program code performing a method of the present invention on a display showing an address book activity folder for contacts.

FIG. 11 shows the functioning of a software method of the present invention when the Contacts Tab 54 is selected. When the Contacts Tab 54 is selected, an ADDRESS BOOK area 56 is displayed. The ADDRESS BOOK Area 56 corresponds to the My Documents area 34 when the Folders Tab 32 is selected. (Refer to the description of FIG. 4). When the ADDRESS BOOK 56 is selected, the Workspace 90 displays a list of contacts that have been stored in ADDRESS BOOK 56. A user enters the particulars of a contact by keying in the requested information in Fields 62, 64, and 66. A user may also create folders in the ADDRESS BOOK Area 56 in which related contacts may be stored. Shown in FIG. 11 is Activity A folder 58, which contains three contacts, 58a-c.

With continuing cross reference between FIG. 11 and FIGS. 6, 8-10, Contact 1, identified as 58a in FIG. 11, is the same Contact 1 as listed in Field 70f of file 44a. Contact 1 sent the Memo on Activity A file, 44a, as shown in FIGS. 6-10. To send a document to a particular contact, a user, working with the Contacts Tab 54 activated, uses the pick-and-drop technique. The user picks a contact from those shown within the Workspace Area 90 (typically by clicking on it). For example, in FIG. 11, Contact 4, 58c, may be selected. A user then activates the Folders tab 32, opens the Activity A folder 58, activates an activity-oriented folder, for example, Activity A 42a, as shown in FIGS. 6-10. The user then "drops" the contact onto a file in Activity A 42a by deactivating the contact. The contact is now associated with the file and the file may now be sent to the contact.

Relationships Among Program Modules

Figure 12:
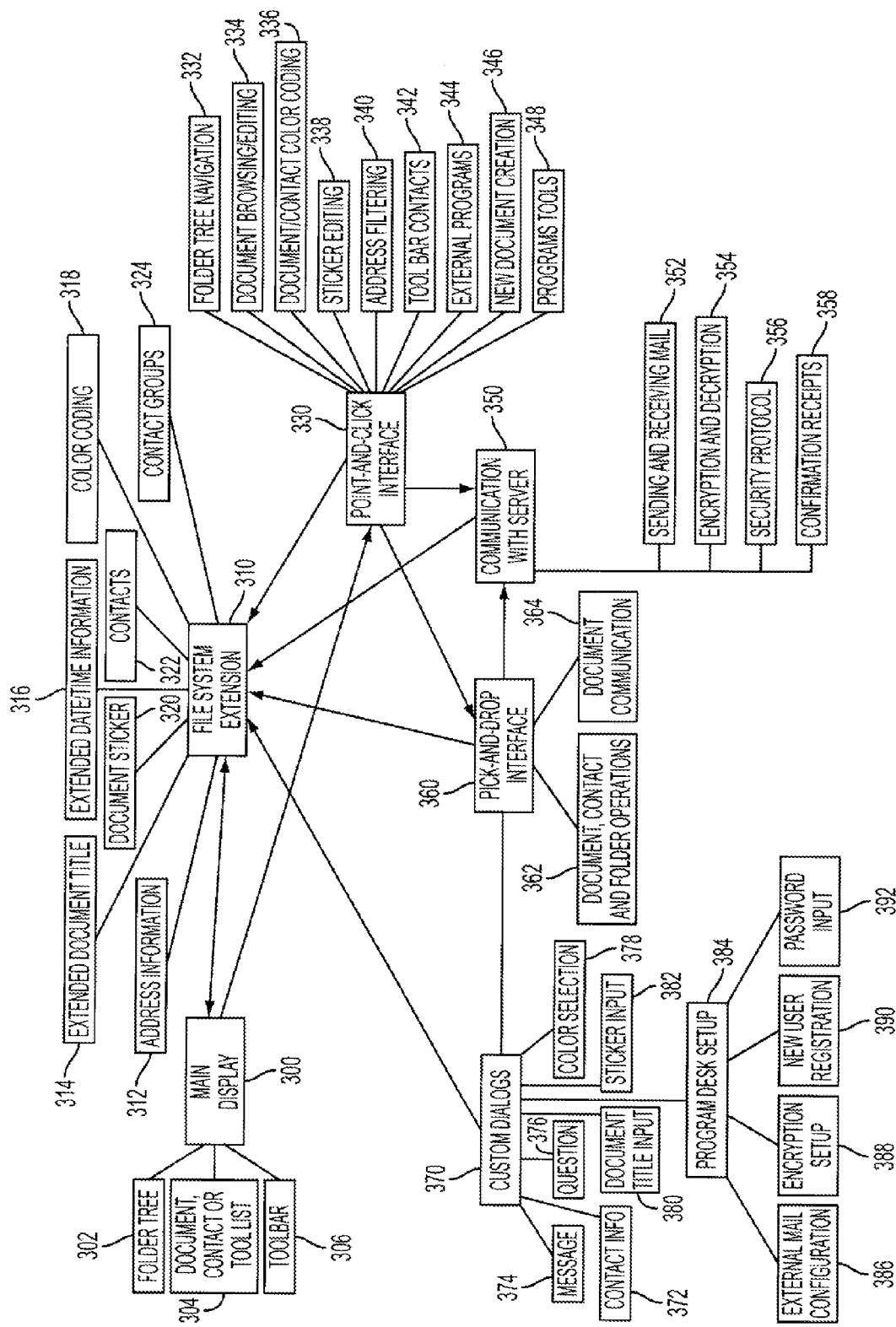
FIG. 12 is a collaboration diagram showing program modules and parts of program modules as well as the interactivity among them of a software method of the present invention.

FIG. 12 shows a state diagram that illustrates the collaboration and interactivity among modules and part modules especially as these relate to information input by a user of a software program of the present invention. The modules comprise Main Display 300, File System Extension, 310, Point-and-Click Interface 330, Communication with Server 350, Pick-and-Drop Interface 360 and Custom Dialogues 370. The program modules allow user interaction with contacts, documents, web links, mail and other objects that are stored within and accessible from a user-defined activity folder.

Main Display 300 and File System Extension 310

The Main Display 300 represents the choices available to the user when the inventive program first opens: namely, the Folder Tree 302, the Document, Contact or Tool List 304 or the Toolbar 306. File System Extension 310 provides data to files shown in the Main Display 300, which a user may access through the Folder Tree 302 of the Main Display 300. Two-way communication exists between the Main Display 300 and File System Extension 304, which means that the File System Extension 304 allows a user to add various kinds of information to different kinds of file types and the information will be shown in the Main Display 300. There are several pieces of information the File System Extension 310 allows a user to add to a file, including Address Information 312, Extended Document Title 314, Extended Date/Time Information 316, Color Coding 318, Document Sticker 320, Contacts 322 and Contact Groups 324.

The File System Extension 310 receives information input from the Main Display 300, the Point-and-Click Interface 330, Communication with Server 350, the Pick-and-Drop Interface 360 and sends the information to the files and objects displayed in Main Display 300.

Point-and-Click Interface 330

From the Main Display 300, a user may activate a Point and Click Interface 330 to accomplish various operations. Activating a Point and Click Interface 330 may be done by using any device having a pointing function, such as a mouse, trackball, touchpad, etc. The operations that may be accomplished through a Point and Click Interface 330 include Folder Tree Navigation 332, Document Browsing/Editing 334, Document/Contact Color Coding 336, Sticker Editing 338, Address Filtering 340, Toolbar Contacts 342, External Programs 344, New Document Creation 346 and program Tools 348.

Through the Point-and-Click Interface 330 the user may interact with Custom Dialogues 370, a Pick-and-Drop Interface 360 or Communication with Server 350. The Point-and-Click Interface 330 receives information from the Main Display 300 and sends information to the Pick-and-Drop Interface 360, Communication with Server 350 and the File System Extension 310.

Communication with Server 350

A Communication with Server 350 module allows the user to perform various functions, including Sending and Receiving Mail 352, Encryption and Decryption 354, Security Protocol 356 and Confirmation Receipts 358. Communication with Server 350 receives information from Point-and-Click Interface 330 or Pick-and-Drop Interface 360 and sends information to the File System Extension 310.

Pick-and-Drop Interface 360

The Pick-and-Drop Interface 360 receives information from the Point-and-Click Interface 330 and sends information to Custom Dialogues 370, Communication with Server 350 and File System Extension 310.

Custom Dialogues 370

Various customized dialogues may be displayed to a user in response to information that is received from the Point-and-Click Interface 230 or Pick-and-Drop Interface 260 and then sent to the File System Extension 210 module. These dialogues include Contact Information 372, Message 374, Question 376, Color Selection 378, Document Title Input 380, Sticker Input 382, program Setup 384, External Mail Configuration 386, Encryption Setup 388, New User Registration 390 and Password Input 392.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory of one or more computer systems configured generally as described in FIG. 1. Until required by the computer system, the set of instructions may be stored in another computer-readable memory, for example, in a hard disk drive, or in a removable memory such as an optical disk for use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer-readable information.

Operation

Figure 13:
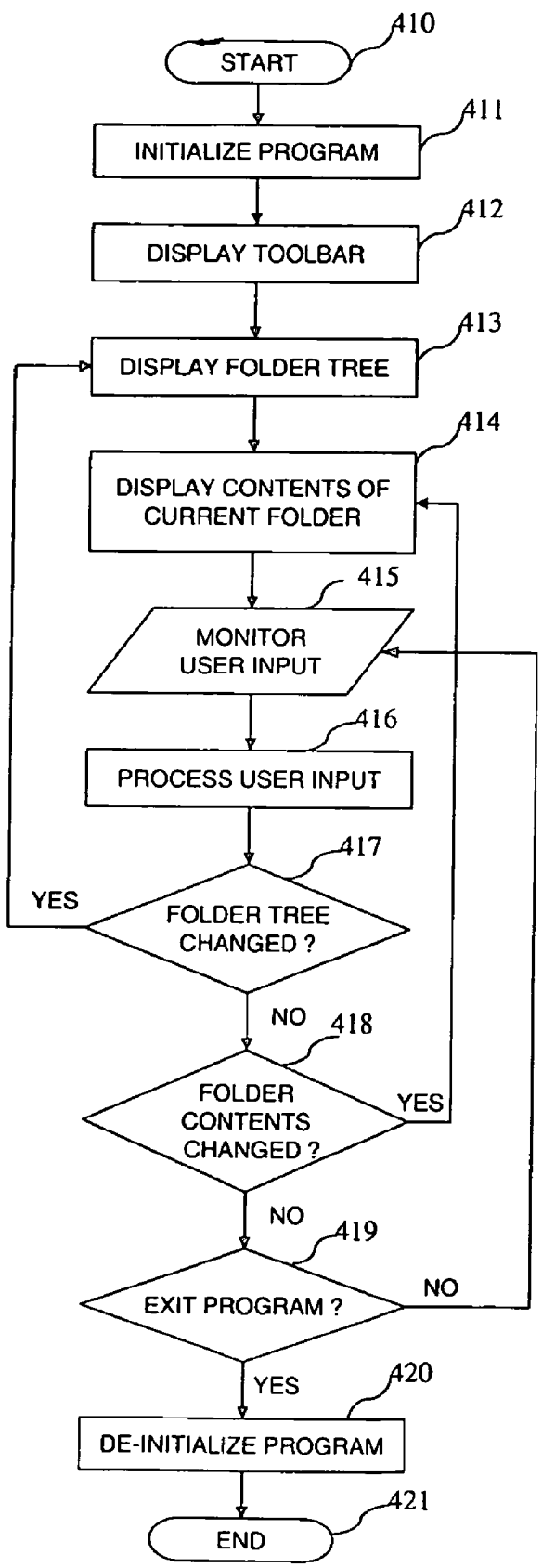
FIG. 13 is a diagram showing the operation of a client program according to one aspect of the present invention.

FIG. 13 is a flow chart diagram showing the operation of a client program according to one aspect of the present invention. After program start 410 an initialize program sequence 411 is performed an a toolbar display 412 is presented. In addition, a "display folder tree" subroutine 413 is performed. A "display contents of current folder" subroutine 414 is performed and user input is monitored 415. User input is processed by a "process user input" subroutine 416 and a determination 417 is made if the folder tree is changed. If the folder tree has changed the display folder tree subroutine 413 is again performed; if not a determination 418 is made of whether the folder contents have changed. If the folder contents have changed, the "display contents" subroutine 414 is again performed; if not, a determination 419 is made whether to exit program. If the program is not to be exited, the program continues to monitor user input 415; otherwise, a de-initialize program subroutine 420 is performed. After deinitialization 420, the program terminates 421.

Figure 14A:
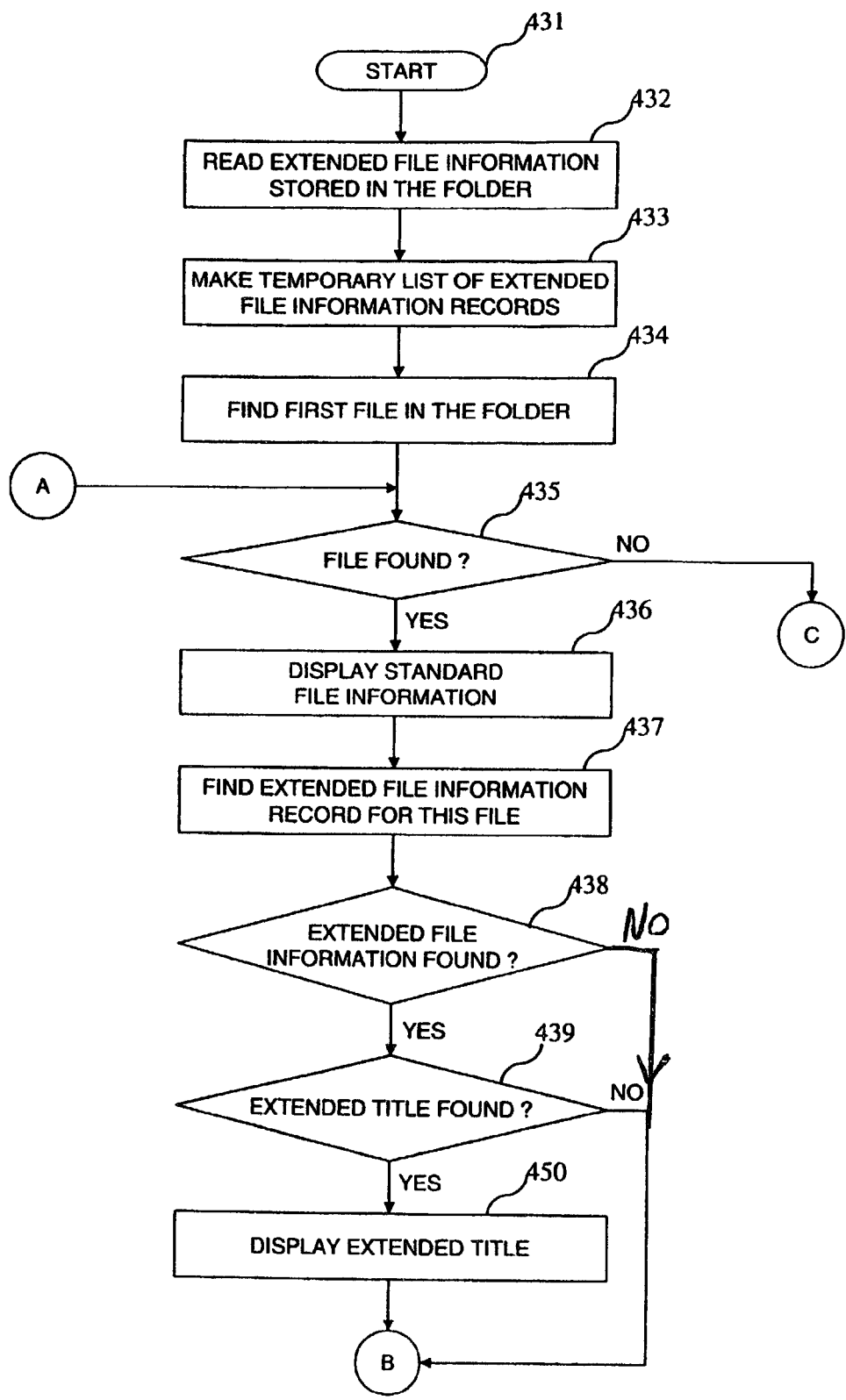
FIGS. 14A-14C are diagrams showing the operation of a "display contents of current folder" routine used with the client program of FIG. 13.
Figure 14B:
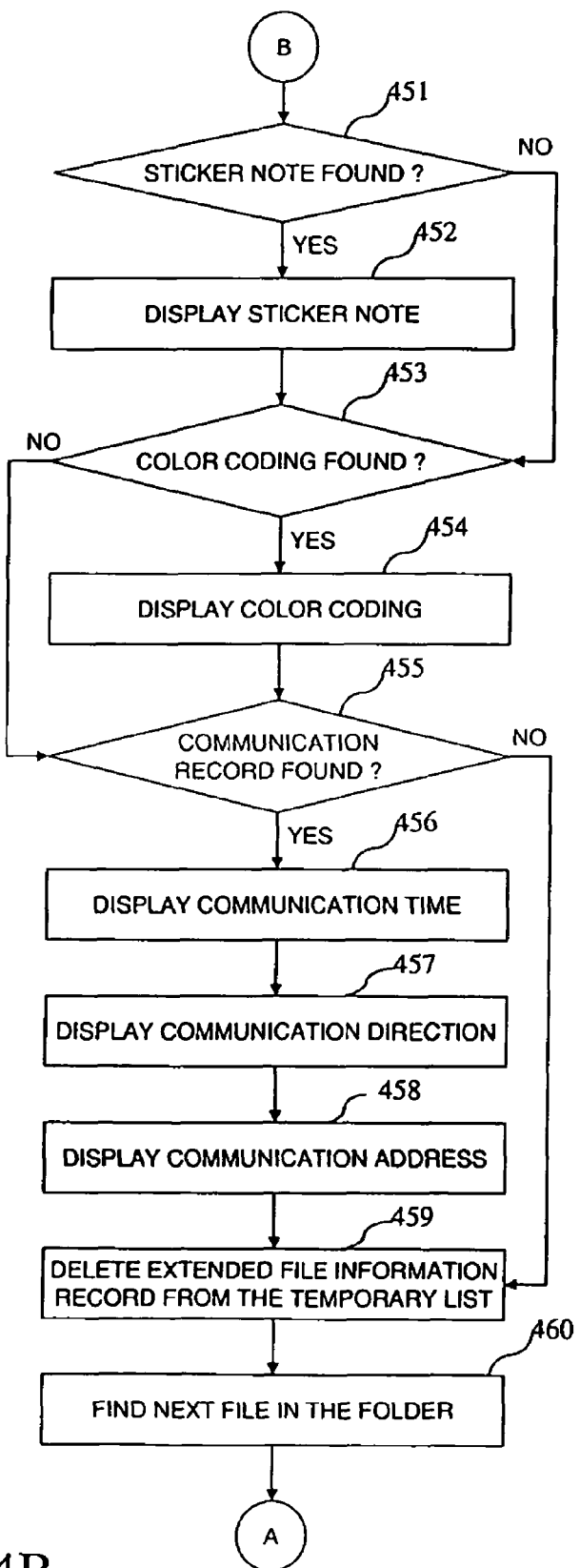
Figure 14C:
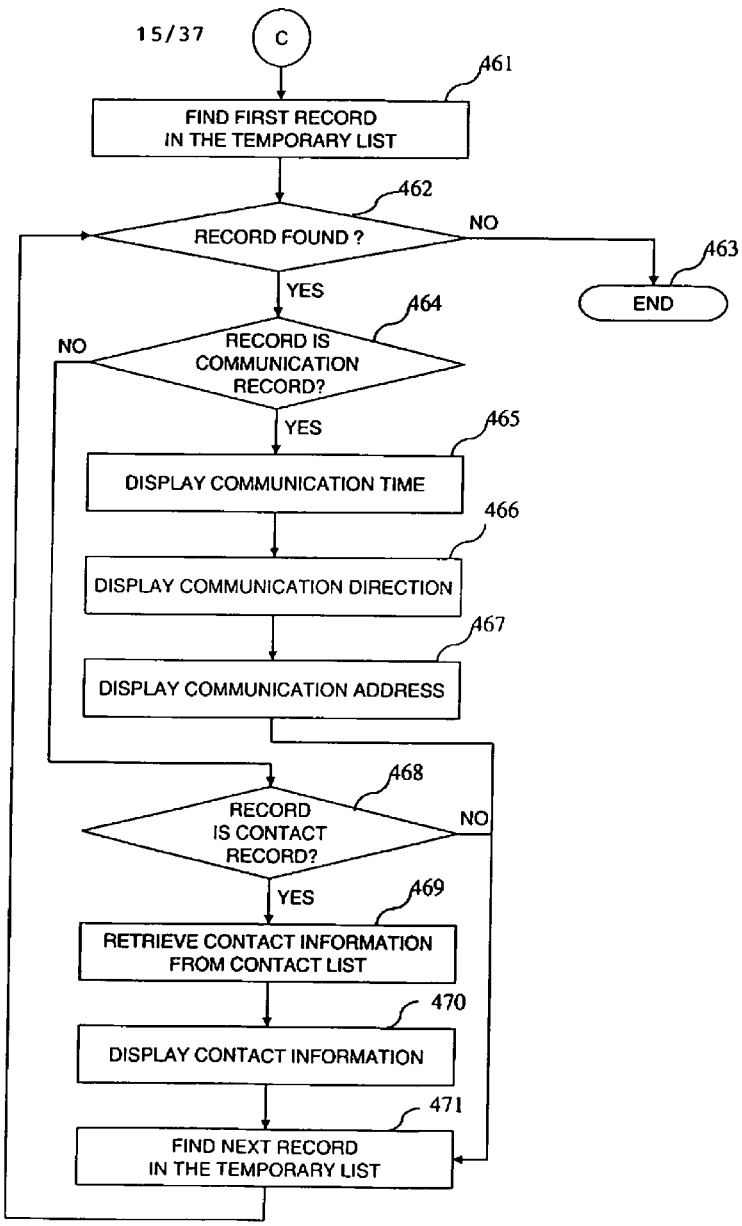

FIGS. 14A-14C are flow chart diagrams showing the operation of a "display contents of current folder" routine 414 used with the client program of FIG. 13. Upon start 431, an extended file information set is read 432. This provides file information stored in the folder. A temporary list of extended file information records is made 433, and the first file in the folder is located 434. A determination 435 is made if the first file in the folder is located 434. If the first file in the folder is located 434, then a display 436 of standard file information is made. Extended file information for this file is found 437, a determination 438 is made of whether the extended file information is found and a determination 439 is made of whether an extended title is found. If these determinations 438, 439 result in "yes" answers, then a display 450 is made of an extended title. If these determinations 438, 439 result in a "no" answer, then no display 450 of the title is made. The non-determination is usually indicative of a hidden file or another file type which would typically not be used by someone working with the file system at a user level. In either case, a determination 451 is made as to whether a sticker note is found. If a sticker note is found, a display 452 of the sticker note is made regardless of whether the sticker note is found 451, a decision 453 is made as to whether color coding is found. The color coding is a function of the software coded according to one embodiment of the invention and indicates a user preference for the file. If color coding is found (453), the color coding is displayed 454. Regardless of whether the color coding is found (453), a determination 455 is made as to whether a communication record is found. If a communication record is found, a display 456 is made of the communication time, display 457 of the communication direction is made, a display of 458 of the communication address is made, and a deletion 459 is made of the extended file information from a temporary list.

Regardless of whether a communication record is found (455), a find 460 of the next file in the folder executed. At this point, the sequence beginning with the determination 435 is made of whether the file is found, and the sequence is continued. If the determination 435 of whether the file is found is negative, then a find 461 procedure is instituted to locate the first record in the temporary list. A determination 462 is made as to whether the record is found. If the record is not found, then the routine terminates 463. If the record is found, a determination 464 is made as to whether the record is a communication record. If the record is a communication record, then a display 465 of communication time, a display 466 of communication direction and a display 467 of communication address made. If the determination (464) is that the record is not a communication record, then a determination 468 of whether the record is a contact record is made. If the record is a contact record, then the contact information is retrieved 469 from a contact list, and a display 470 is made of the contact information. If the record is determined (464) not to be a communication record, or a determination (468) is made that the record is not a contact record, or the display of communication or contact (465, 466, 467 or 470) is made, then the next record in the temporary list is found for 471. The record found determination 462 is repeated until the last record in the temporary list is found. The records may be displayed as a communication address 467 or as a contact information display 470. At that time, the result of the record found decision 462 is negative and the process terminates 463.

Figure 15A:
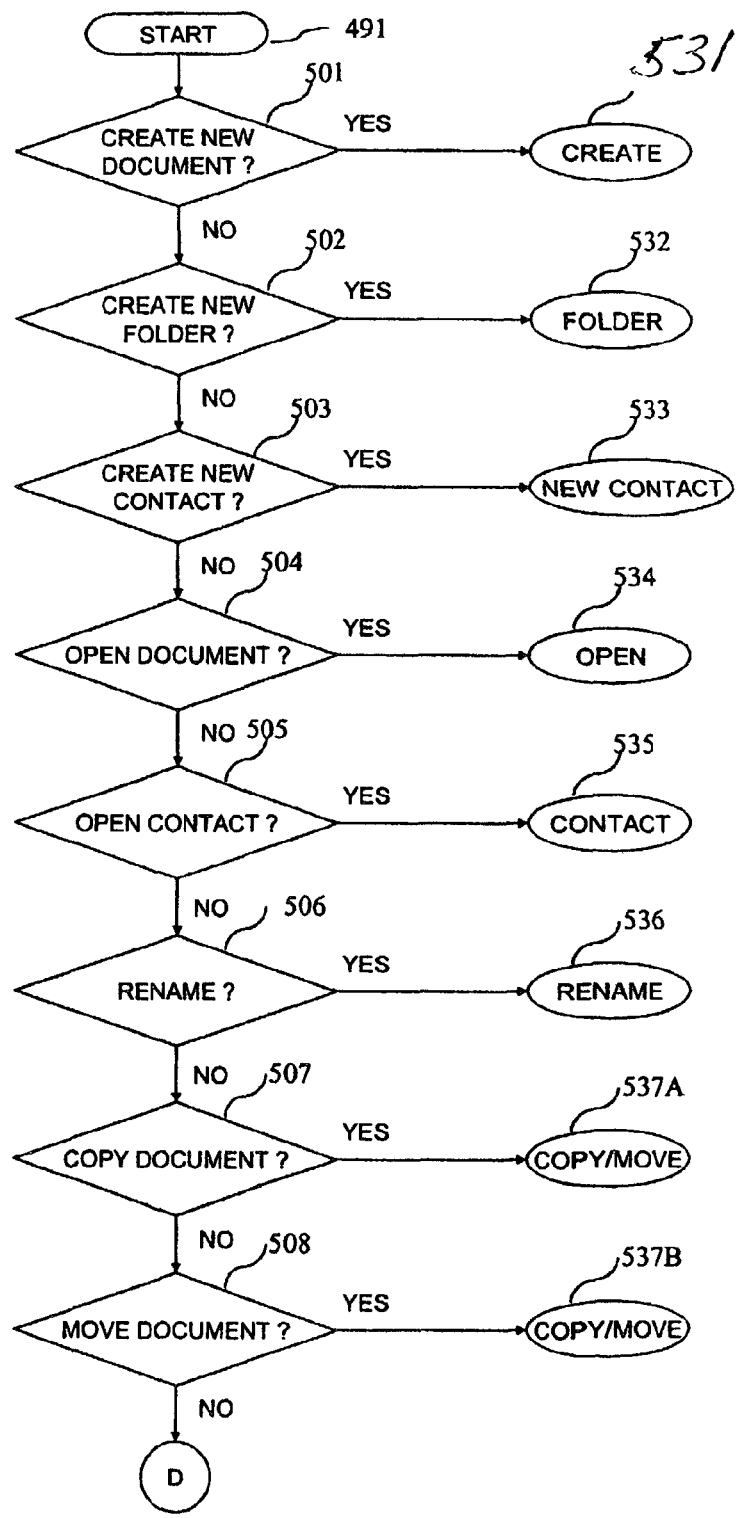
Figure 15C:
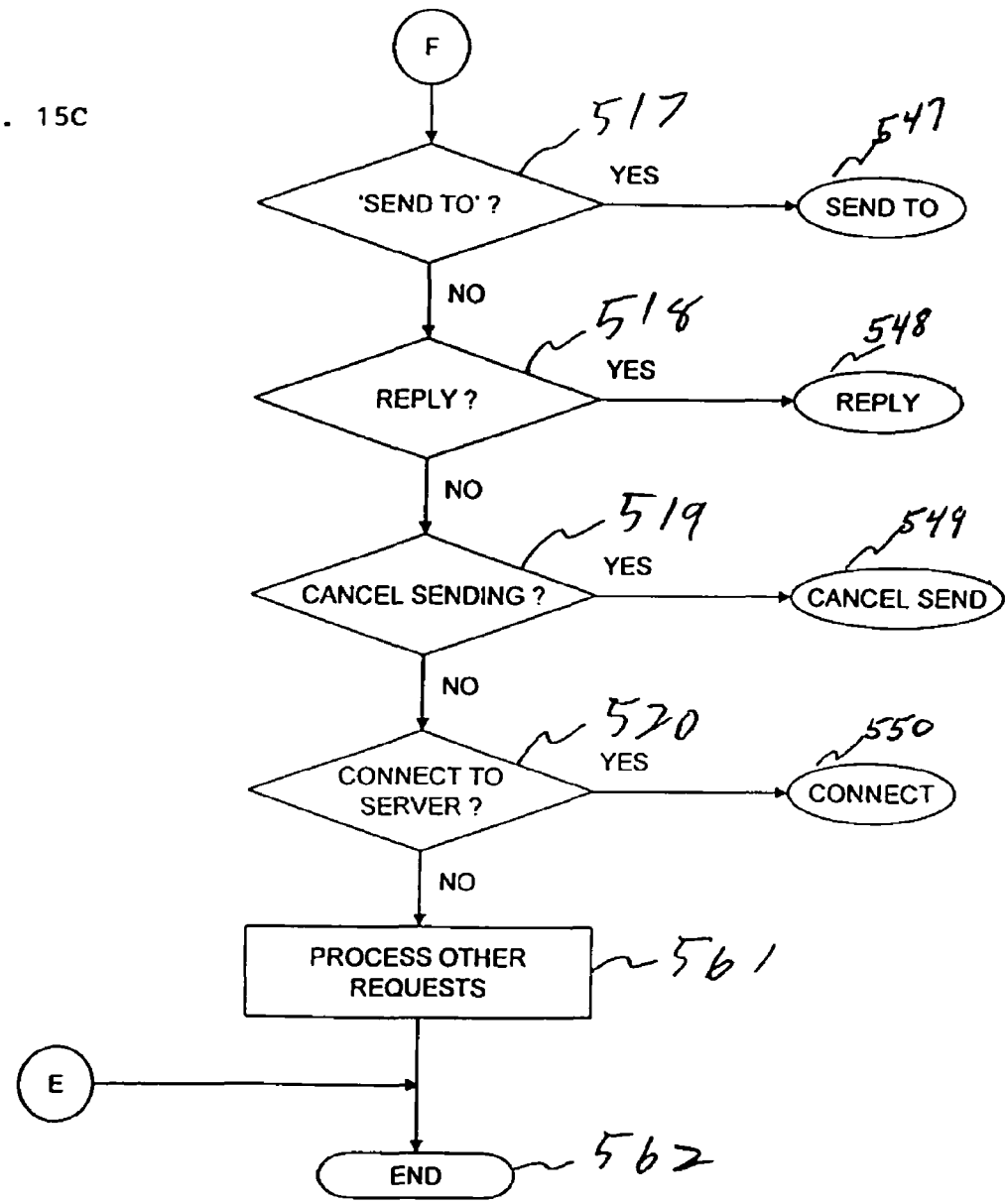

FIGS. 15A-15C are a flow chart depicting the processor user input step 416 of FIG. 13. The "process user input" subroutine accepts one of a number of different user inputs. In the example, user inputs 501-520 are processed. These include, create new document 501, create new folder 502, create new contact 503, open document 504, open contact 505, rename 506, copy document 507, move document 508, move folder 509, duplicate document 510, delete 511, print document 512, color code document 513, sticker attach 514, add to contacts 515, send document 516, send to 517, reply 518, cancel sending 519, and connect to server 520. Each of these user inputs 501-520 invokes a corresponding decision. Upon each decision, a corresponding procedure 531-550 is invoked.

Procedure 542 is used to invoke a print program which is supplied with the operating system, such as Microsoft Windows 9x or later editions. The "print document" procedure 542 is treated in a different manner than the other procedures 531-541 and 543-550 in that the "print document" procedure 542 executes through an external printing routine provided with the operating system or otherwise separately installed. The "print document" procedure 542 is executed by a separate program which is associated with the operating system, such as the Microsoft Windows Operating System. In order to provide an acknowledgment to the "process user input" subroutine 416, the "process user input" subroutine 416 is not terminated 562 until the conclusion of the "print document" process 542. Print routines such as the Microsoft Windows "print" function, Postscript, Ghostscript and others are well-known to those skilled in the art of consumer level computers. The use of these print routines avoids a requirement to configure printers for each installed program. In the case of the present invention, the use of standard print routines provides convenient printing capabilities which can be executed according to the configuration of the printer and a file registration list.

In addition, it is possible to provide for processing other requests 561. After all decisions 509-520 and other process requests 561 are executed, the "process user input" subroutine 416 terminates 562.

Each of FIGS. 16-32 depict respective ones of the processes or procedures invoked by the "process user input subroutine 416.

Figure 16:
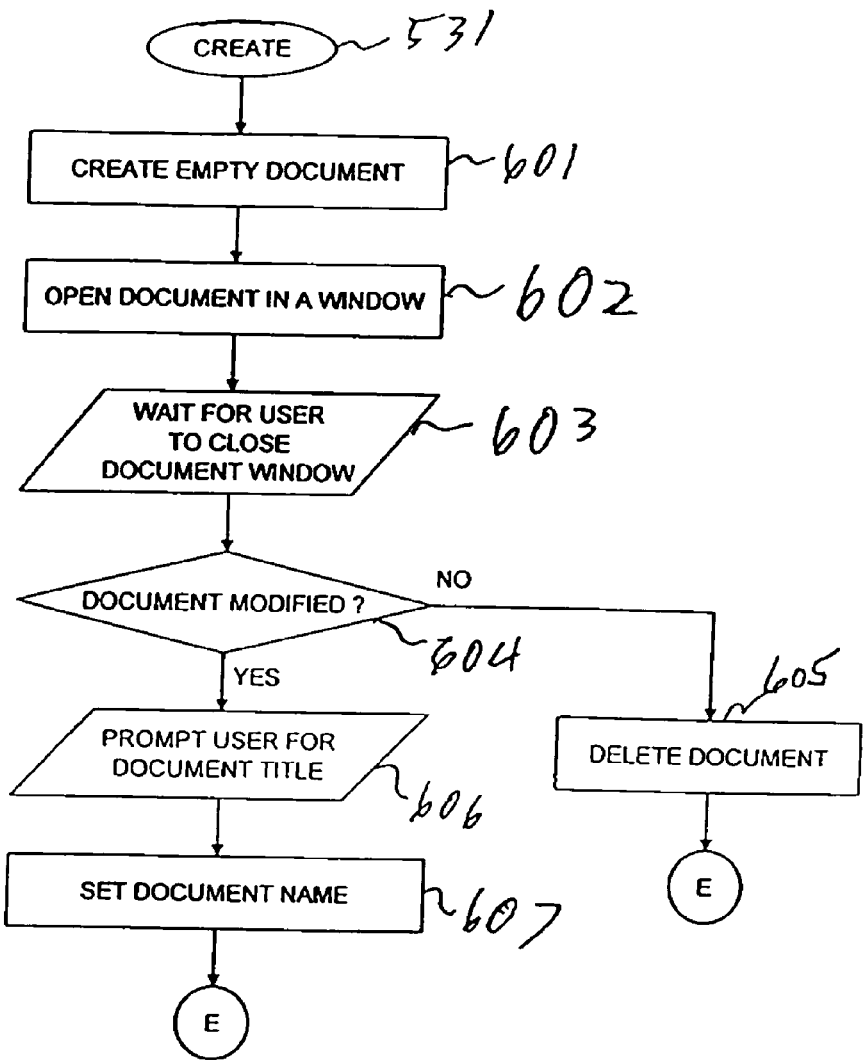
FIG. 16 is a diagram showing the "create" routine used with the sequence of FIGS. 15A-15C.

FIG. 16 is a flow chart depicting the "create" procedure 531. Upon invoking the create procedure 531, an empty document is created 601, and the document is opened in a window 602. The user is able to execute instructions, typically text input, and the process waits for the user to close 603 the document window. A determination 604 is made as to whether the document is modified, and if it has not been modified, the new occurrence of the document is deleted 605. If the document has been modified, the user is prompted 606 for a document title. The document title is used to set 607 the document name. The user input is then ended 562.

Figure 17:
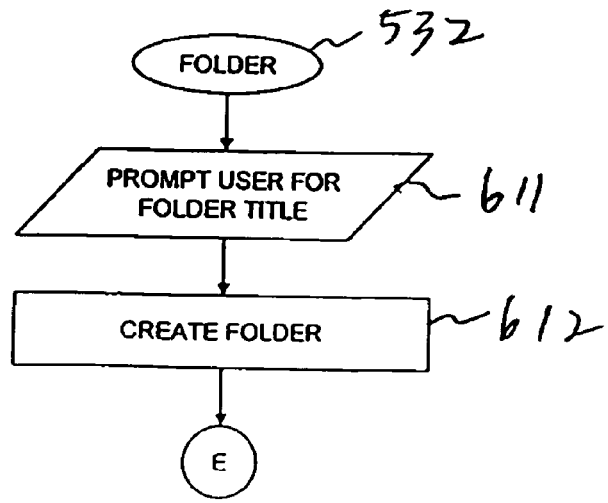
FIG. 17 is a diagram showing the "folder" routine used with the sequence of FIGS. 15A-15C.

FIG. 17 is a flow chart depicting the "create new folder" routine 532. Upon invoking the "create new folder" routine 532, the user is prompted for a folder title 611 and a folder is created 612. At that point, the waiting for user input routine ends 562.

FIG. 18 is a flow chart depicting the "open contact" routine 535. Upon invoking the open contact routine 535, information is read 626 from a contact file. The contact information is displayed 621 in an information window. After displaying the contact information 621, the process waits 622 for user input, and a determination 623 is made as to whether the contact information is modified. If the contact information is modified, the information is saved 624 to the contact file. In either case, the process terminates 562. If the "new contact" routine 533 is invoked, the display 621 of the contact information is performed followed by waiting for user input 622 and determining if contact information is modified 623. The modified information is then saved 624.

FIGS. 19A and 19B are a flow chart depicting the "open document" routine 534. Upon invoking the "open document" routine 534, a determination 631 is made as to whether the document is already open. If the document is already open, the process switches 632 to an "open document" window. If the document is not already opened, a determination 633 is made as to whether the document is unread. If the document is unread, the document is then marked 634 as read. Whether or not the document is marked as read or unread, a determination 635 is made as to whether the document is a contact file. If the document is a contact file, a determination 637 is made as to whether the document is already in the contact list. If the document is in the contact list, the process terminates 562. If not, the document is added 638 to the contact list and the process terminates 562. If the document is not a contact file, a determination 639 is made as to whether the document is an executable file. If the document is an executable file, the executable file is executed 640 and the process terminated. If the document is not an executable file, a determination 641 is made as to whether the document is a web link, and if so, the web link is opened 642. If the document is not a web link, a determination 643 is made whether the document is protected from modification. If the document is protected from modification, a backup copy 644 is made and the document is nevertheless opened 645 in a window. The backup copy is used as the protection from modification. If the document is not protected from modification, the document is nevertheless opened 645 in the window, but the backup copy (block 644) is not made. After the document is opened 645, the process waits 646 for the user to close the document window. A determination 647 is made as to whether the document is modified. If the document is modified, a determination 648 is made as to whether the document is protected. If the document is protected from modification, the modified document is renamed 649 and the original document 650 is restored from the backup copy. The process terminates when a determination that the document is not protected is made in block 648 or the original document is restored from the backup copy 650. At this time, the process is terminated 562. If the document has not been modified (block 647), a determination 651 is made as to whether the backup copy has been created 644 is made. If the backup copy is made, the backup copy is deleted 652 and the process terminated. If the backup copy has not been created, the process terminates 562 regardless.

Figure 20:
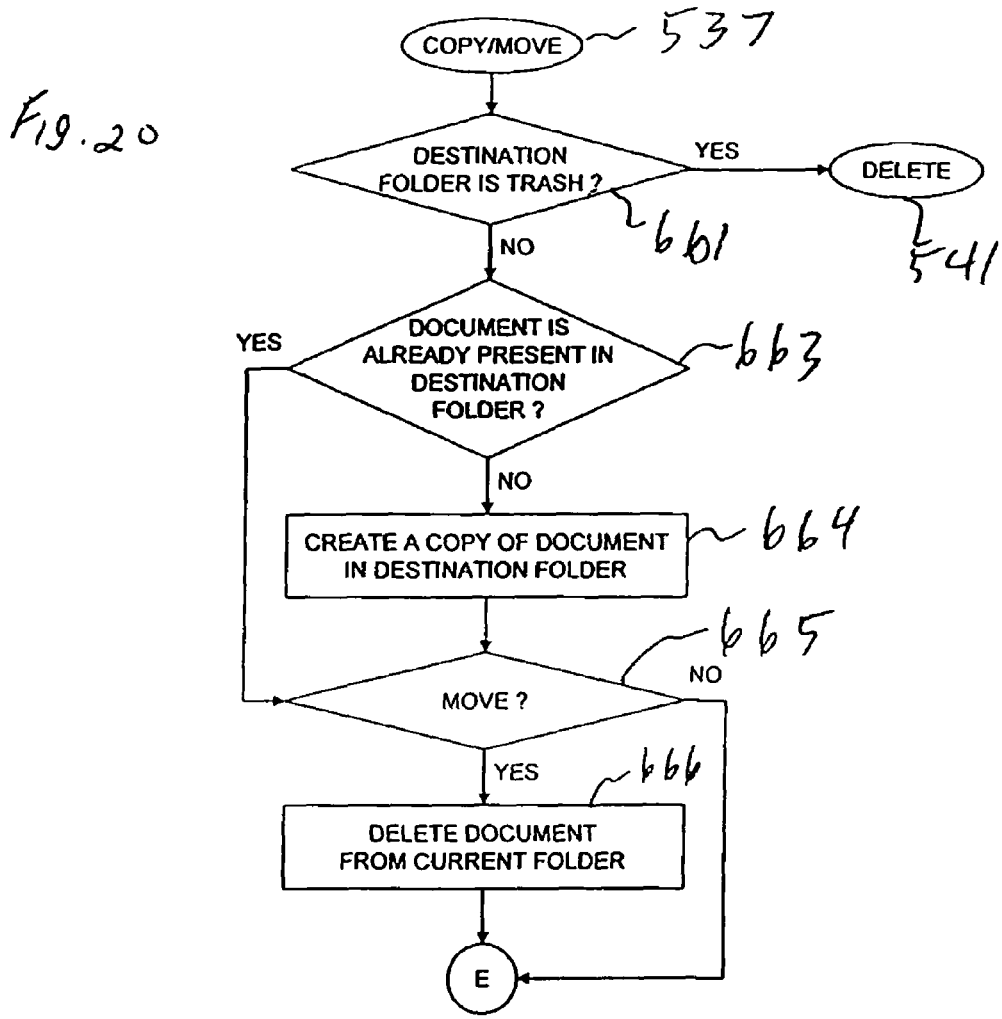
FIG. 20 is a diagram showing the "copy/move" routine used with the sequence of FIGS. 15A-15C.

FIG. 20 is a flow chart depicting the copy and move process 537, shown in FIG. 15. After the copy/move process 537 is invoked from either the copy document determination or the move document determination 508, a determination 661 is made as to whether the folder is considered to be deletable. If the folder is considered deletable, the delete process 541 is invoked. If the folder is not considered to be deletable, a determination 663 is made as to whether the document is already in a destination folder. If the document is not in the destination folder, a copy of the document is created 664 in the destination folder. If the document is already present in the destination folder, a determination 665 is made as to whether to move the folder. If the folder is to be moved, the document is deleted 666 from the current folder and the process terminated 562. If the document is not to be moved, the process is terminated.

Figure 21:
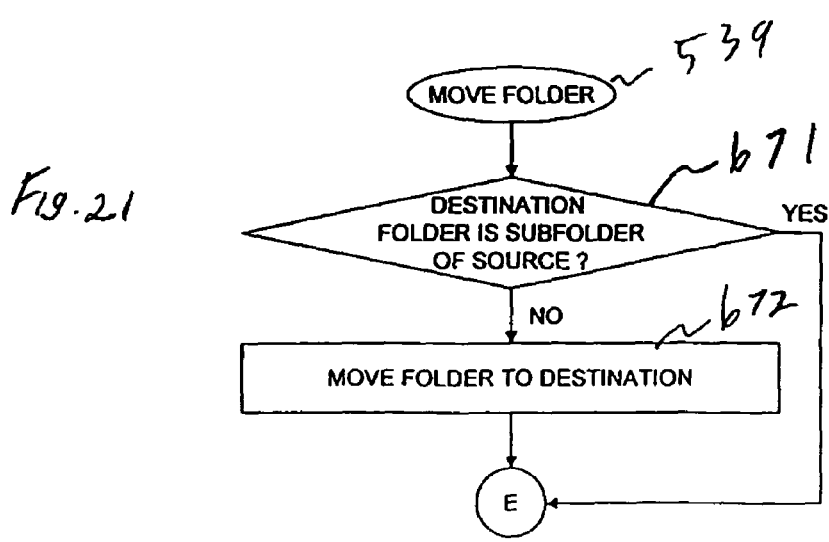
FIG. 21 is a diagram showing the "move folder" routine used with the sequence of FIGS. 15A-15C.

FIG. 21 is a flow chart depicting the "move folder" process 539 invoked by the "process user input" subroutine 416 of FIGS. 13 and 15. Upon initiation of the move folder routine 539, a determination 671 is made as to whether the destination folder is a subfolder of the source. If the destination is a subfolder of the source, the process terminates. If the destination is not a subfolder of the source, the folder is moved 672 to the destination and the process terminates 562.

Figure 22:
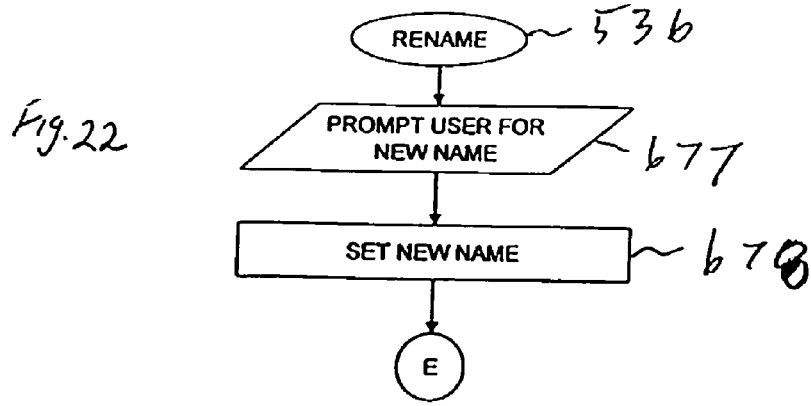
FIG. 22 is a diagram showing the "rename" routine used with the sequence of FIGS. 15A-15C.

FIG. 22 is a flow chart depicting the response to the "rename" process of FIG. 15. Upon invocation of the rename process 536, the user is prompted 677 for a new name. The new name is then set 678 and the process terminated 562.

Figure 23:
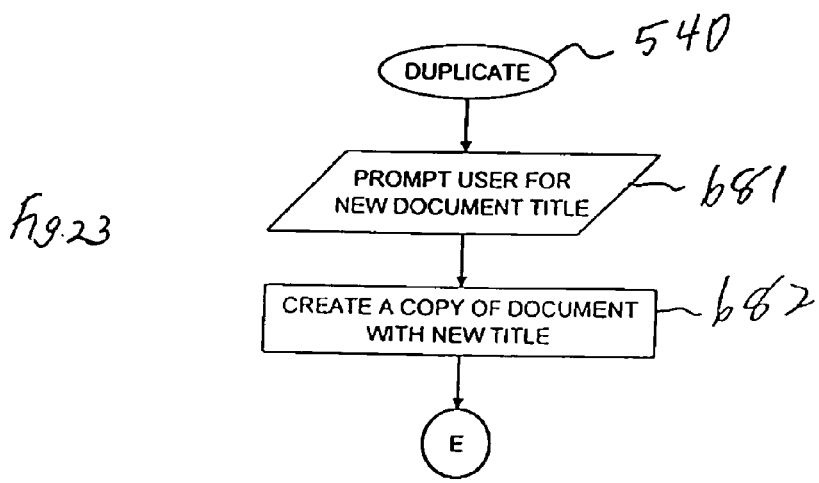
FIG. 23 is a diagram showing the "duplicate" routine used with the sequence of FIGS. 15A-15C.

FIG. 23 is a flow chart depicting the "duplicate" routine 540. Upon invocation of the "duplicate" routine 540, the user is prompted 681 for a new document title and a copy of the document with the new title is created 682, and the process is terminated 562.

Figure 24:
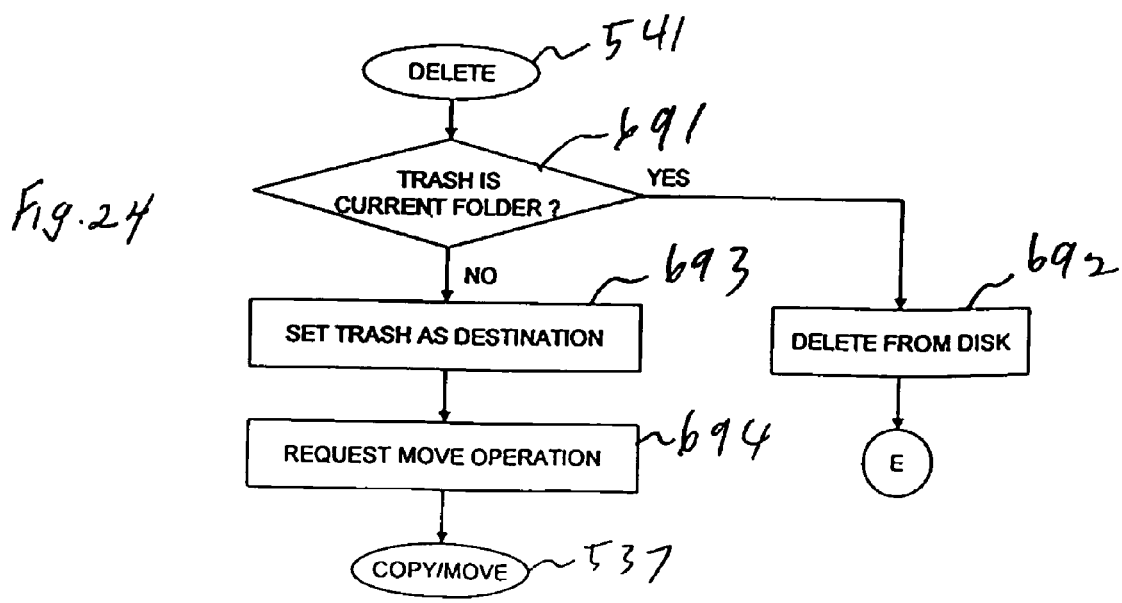
FIG. 24 is a diagram showing the "delete" routine used with the sequence of FIGS. 15A-15C.

FIG. 24 is a flow chart depicting the response to a delete call 541. Upon invocation of the delete call 541, a determination 691 is made as to whether the trash is the current folder. If the trash is the current folder, the folder is deleted 692 from the disk. If the trash is not the current folder, the trash is set 693 as the destination and a request move operation 694 is initiated. This invokes the copy/move call 537. If the folder is deleted from the disk 692, the process terminates 562.

Figure 25:
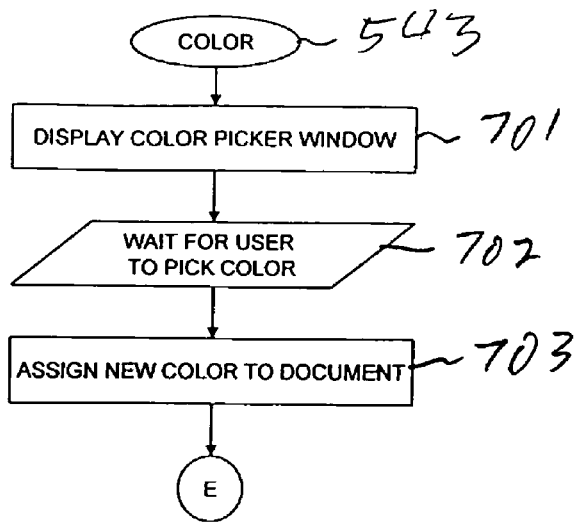
FIG. 25 is a diagram showing the "color" routine used with the sequence of FIGS. 15A-15C.

FIG. 25 is a flow chart depicting a response to a color call 543. Upon invoking the color call 543, a color picker window is displayed 701 and user input 702 is received. Upon receipt of user input 702, the new color is assigned 703 to the document and the process terminated 562.

Figure 26:
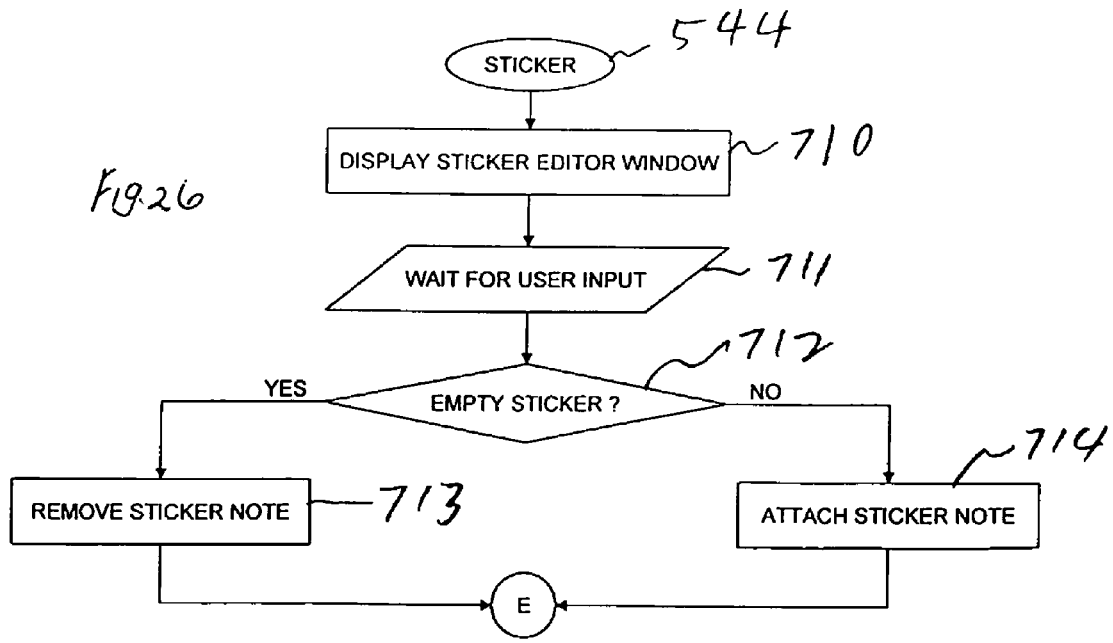
FIG. 26 is a diagram showing the "sticker" routine used with the sequence of FIGS. 15A-15C.

FIG. 26 is a flow chart depicting the response to a sticker call 544. Upon receipt of the sticker call 544, the process displays 710 a sticker editor window. User input 711 is awaited and a determination 712 is made as to whether the sticker is empty. If the sticker is empty, the sticker note 713 is removed and the process terminated 562. If the sticker is not empty, the sticker note is attached 714 to the file and the process terminated 562.

Figure 27:
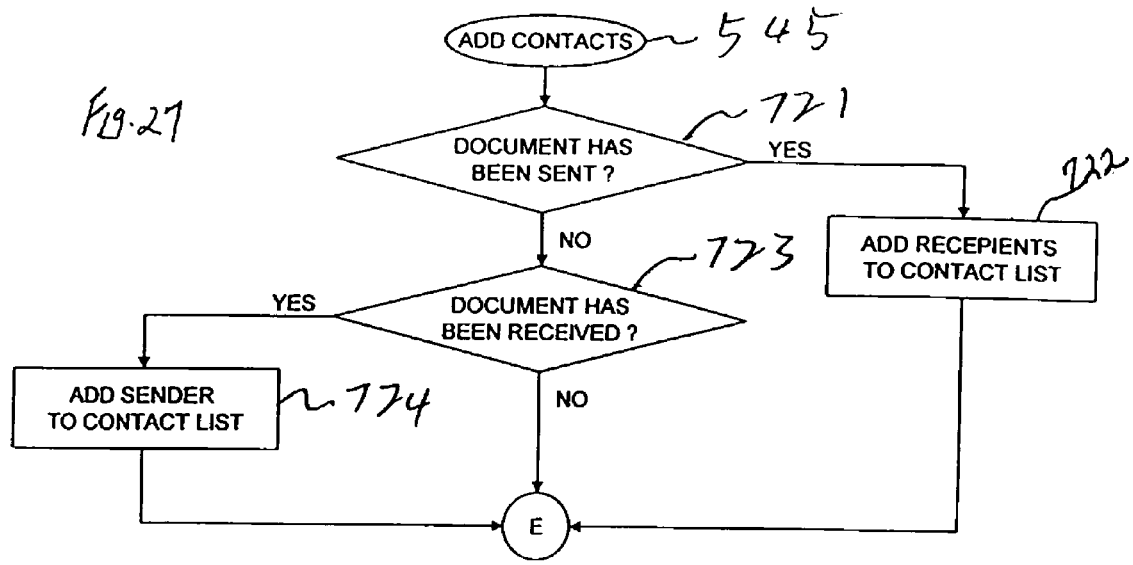
FIG. 27 is a diagram showing the "add contacts" routine used with the sequence of FIGS. 15A-15C.

FIG. 27 is a flow chart depicting the response to the add contacts call 545. Upon invocation of the add contacts call 545, a determination 721 is made as to whether the document has been sent. If the document is sent, the recipients on the document are added 722 to the contact list and the process terminated 562. If the document has not been sent, a determination 723 is made as to whether the document has been received. If the document has been received, the sender is added 724 to the contact list and the process terminated. If the document has been neither sent nor received, the process is terminated 562.

Figure 28:
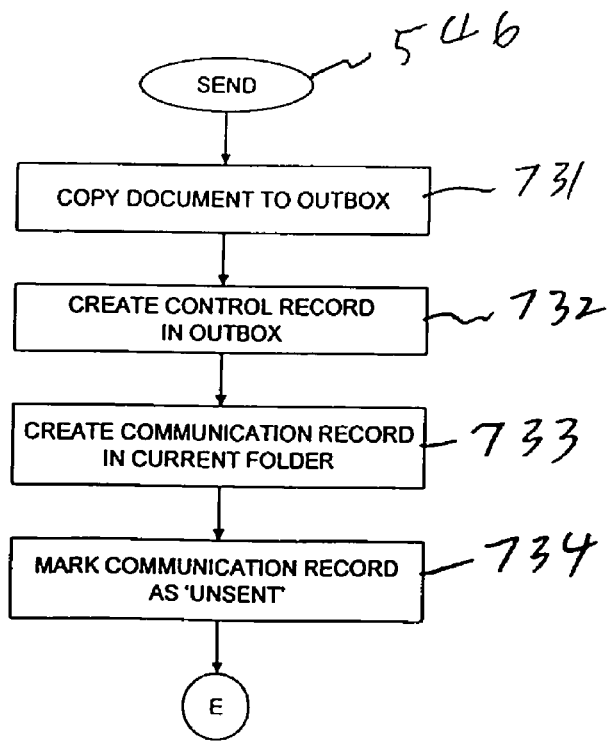
FIG. 28 is a diagram showing the "send" routine used with the sequence of FIGS. 15A-15C.

FIG. 28 is a flow chart depicting the response to the send call of 546. Upon receipt of the send call 546, a copy of the document is sent 731 to an outbox. A control record is also created 732 in the outbox and a communication record is created 733 in the current folder. The communication record is marked 734 as "unsent" and the process terminated 562.

Figure 29:
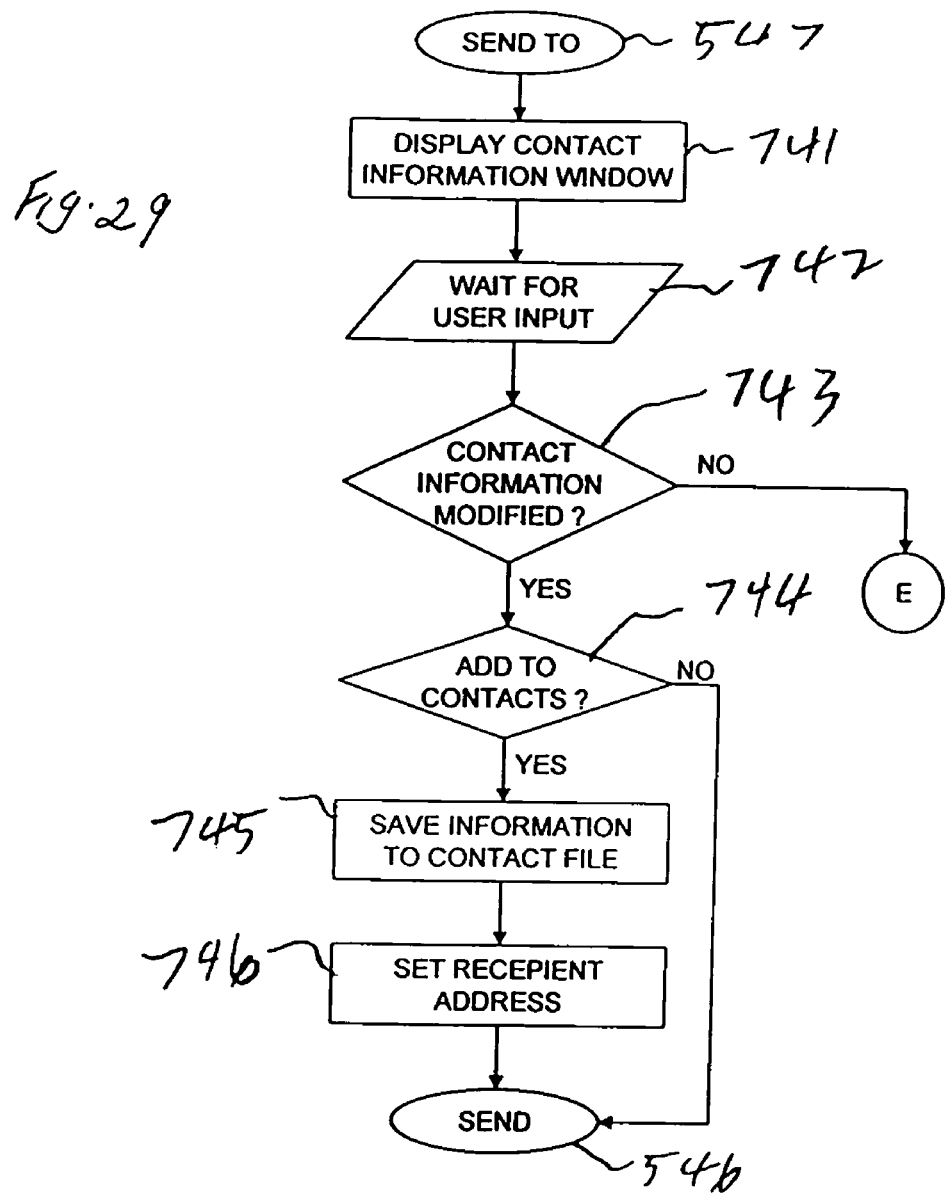
FIG. 29 is a diagram showing the "send to" routine used with the sequence of FIGS. 15A-15C.

FIG. 29 is a flow chart depicting a system response to a send to call 547. Upon invocation of the send to call 547, a contact information window is displayed 741 and the process awaits user input 742. A determination 743 is then made as to whether the contact information has been modified. If the contact information has not been modified, the process terminates 562. If the contact information has been modified, a determination 744 is made whether to add the contact information to the contacts. If the information is to be added to the contacts, the information is saved 745 to the contact file and the recipient address is set 746, followed by invoking a send operation 546. If the contact information is not added to the contacts, the send operation 546 is also invoked.

Figure 30A:
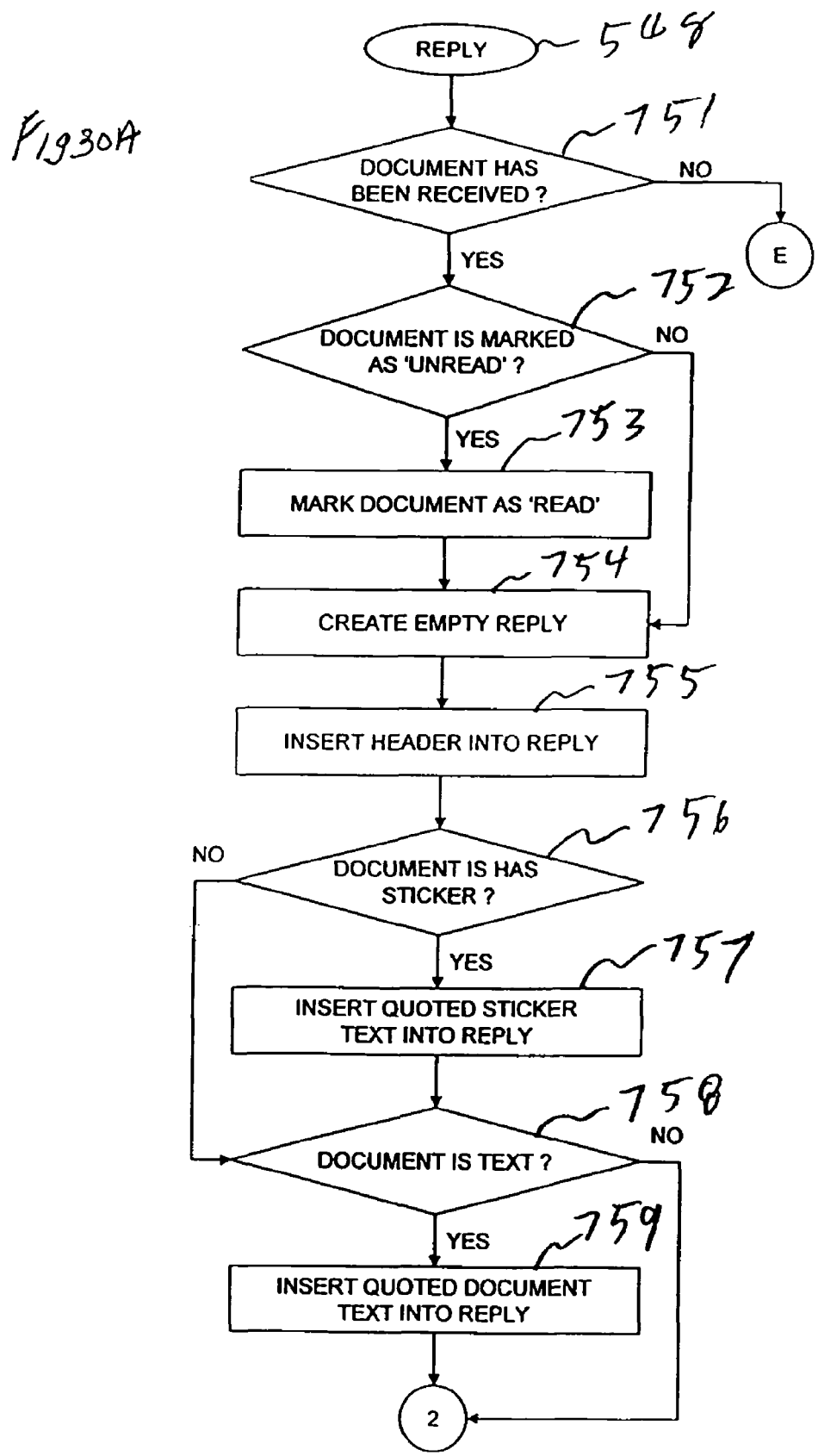
FIGS. 30A-30B are diagrams showing the "reply" routine used with the sequence of FIGS. 15A-15C.
Figure 30B:
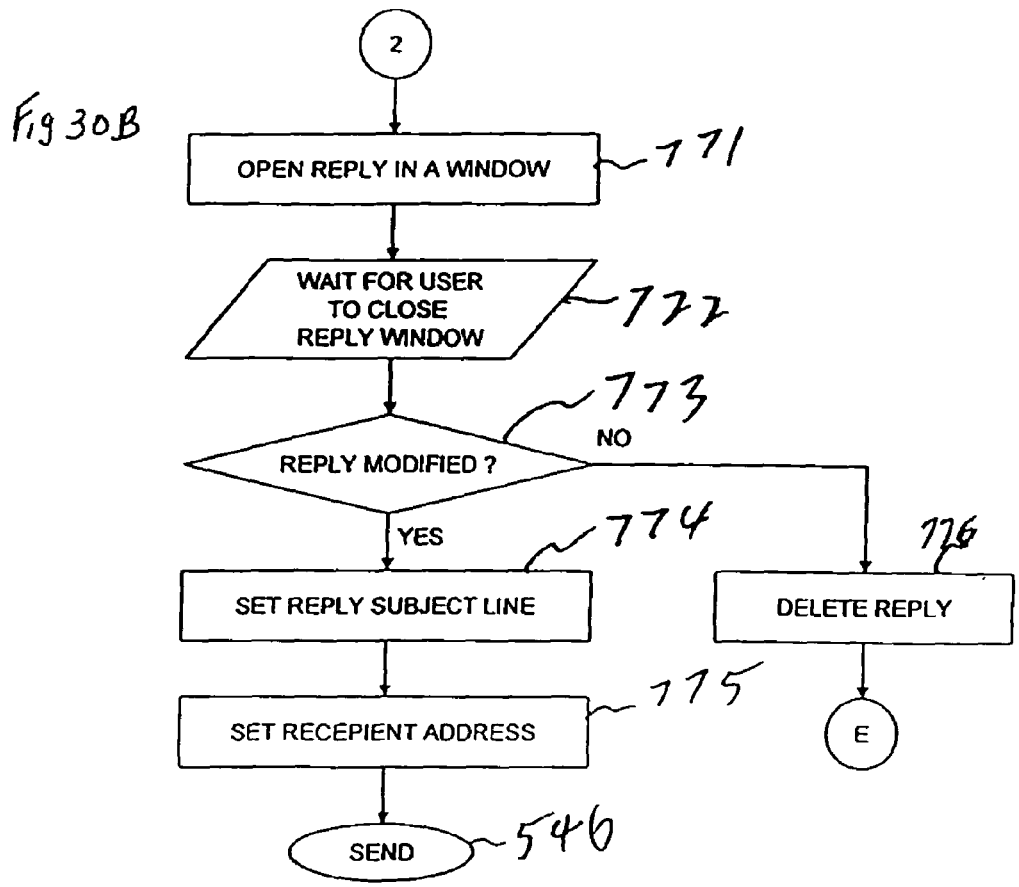

FIG. 30 is a flow chart depicting the system response to a reply call 548. Upon receipt of the reply call 548, a determination 751 is made as to whether the document has been received. If not, then the process is terminated 562. If the document has been received, a determination 752 is made as to whether the document is marked as "unread". If the document is marked as "unread", the document is marked 753 as "read" and an empty reply 754 is created. If the document is not marked as "unread", the empty reply 754 is created. If creating the empty reply 754, a header is inserted 755 into the reply and a determination 756 is made as to whether the document has a sticker. If the document has a sticker, the sticker is inserted 757 into the reply. After inserting the quoted sticker text into the reply 757 or a negative determination is made that the document has a sticker, a determination 758 is made as to whether the document is text. If the document is text, the quoted document text is inserted 759 into the reply and the reply is opened 771 in a window. If the document is not text (block 758), the reply is opened 771 in the window without the inserted quoted document text. After the window is opened 771, user response is awaited 772 in order to close the reply window. A determination 773 is made as to whether a reply is modified. If the reply is modified, the subject line is set 774 and the recipient address is set 775. This results in an invocation of the send call 546. If the reply has not been modified (block 773), the reply is deleted 776, and the process terminated 562.

Figure 31:
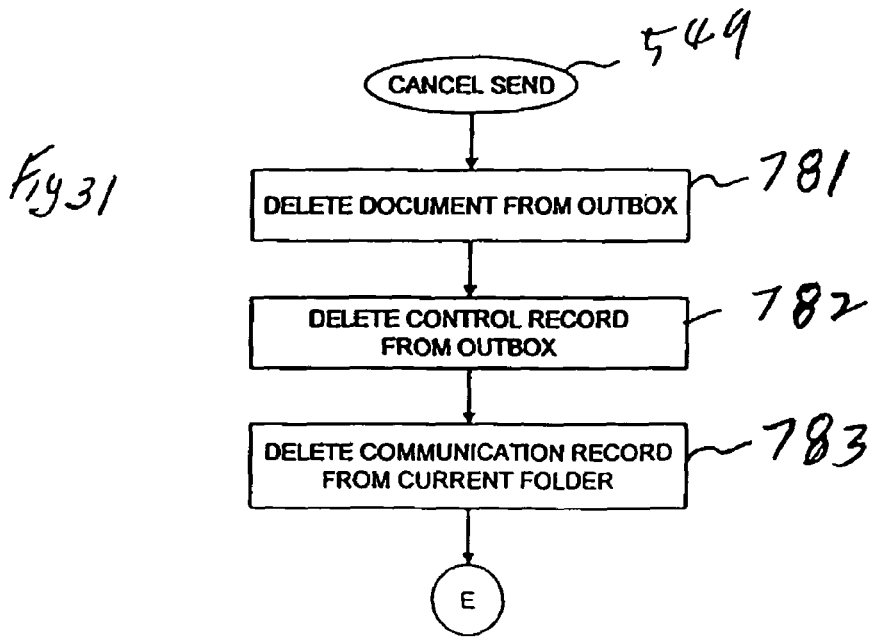
FIG. 31 is a diagram showing the "cancel send" routine used with the sequence of FIGS. 15A-15C.

FIG. 31 is a flow chart depicting a response to a cancel send call 549. Upon invocation of the cancel send call 549, the document to be canceled is deleted 781 from the outbox, the control record is deleted 782 from the outbox and the communication record is deleted 783 from the current folder. The process is then terminated 562.

Figure 32:
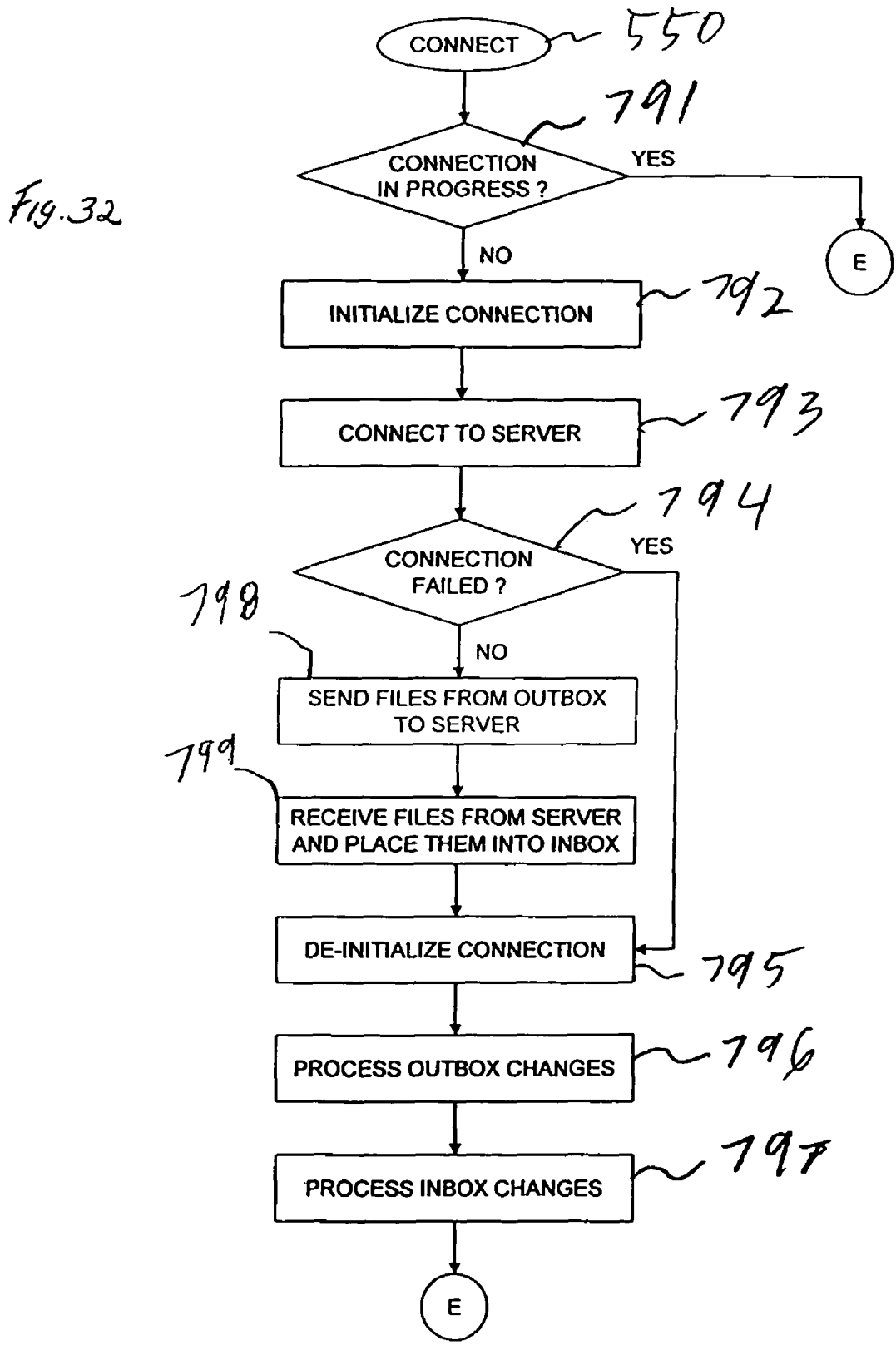
FIG. 32 is a diagram showing the "connect" routine used with the sequence of FIGS. 15A-15C.

FIG. 32 is a flow chart depicting a response to a connect call 550. Upon invocation of the connect call, a determination 791 is made as to whether a connection is already in progress. If a connection is not in progress, a connection is initialized 792 and a connection 793 to the server is effected. Upon connection to the server, a determination 794 is made as to whether the connection has failed. If the connection has failed, the connection is de-initialized and process outbox changes and process inbox changes are made 796, 797. The process is then terminated 562. If the connection has not failed, files from the outbox server are sent 798 and files from the server are received 799 and placed in the inbox. The connection is then de-initialized 795, outbox changes are processed and inbox changes are processed 796, 797, followed by process termination 562.

FIG. 33 is a flow chart showing the process of sending files from the outbox to the server 798 of FIG. 32. Upon starting 831 the send operation, a first control record is found 832 in the outbox. A determination 833 is made as to whether the record is found. If a record has not been found, the send operation 798 is ended 834. If a record has been found, a request is made for the recipient's public key 835 and a determination 836 is made as to whether the public key is obtained. If the public key is obtained, the file is encrypted 837 with the public key, and the control record is sent 838 to the server. If the public key is not obtained, a determination 839 is made as to whether the recipient is marked "enforced encryption". If the recipient is not marked with "enforced encryption", the control record is sent 838 to the server. After sending the control record to the server in either case, the file is sent 840 to the server, the file is deleted 841 from the outbox, the control record is deleted 842 from the outbox and a find 843 operation is performed for the next control record. If the recipient is marked with "enforced encryption", the find operation 843 is invoked but the file is not encrypted nor sent. After invoking the find operation 843, the process then again determines 833 if the control record is found and the process continues until a control record is not found, thereby ending 834 the process.

FIG. 34 is a flow chart showing the operation of the "send files from outbox to server" routine 798 depicted in FIG. 32. Upon process start 851, a find operation 852 is initiated to find a first communication record marked as "unsent". A determination 853 is made as to whether the communication record is found. If the communication record is found, a determination 854 is made as to whether a corresponding file exists in the outbox. If a corresponding file is in the outbox, the communication is marked 855 as "sent". Then a find next communication record marked as "unsent" is initiated. The next marked as "unsent" is also found if the corresponding file does not exist in the outbox (block 854) with marking the (nonexistent) corresponding file as sent. This initiates determination 853 as to whether the communication record is found. If the communication record is not found, the process ends 857 and the "process inbox changes" 797 routine is initiated (FIG. 32).

FIGS. 35A and 35B are a flow chart showing the process for the processing of outbox changes 796 shown in FIG. 32. Upon start 861, the process first attempts to find 862 a first control record in the inbox. A determination 863 is made as to whether the control record is found. If the control record is found, a determination 864 is made as to whether the message is an RFC-822 record. An RFC-822 record is typically received from outside sources on the Internet and is handled accordingly by processing 865 as an RFC-822 record. If a control record is not found (determination 863), the process 797 is ended 866. If the message is found but is not an RFC-822 message (determination 864), a determination 867 is made as to whether the message is encrypted. If the message is encrypted, the message is decrypted 868 with the user's private key. In either case, extended information is read 869 from the control record. A determination 870 is then made as to whether the message is a delivery confirmation receipt. If the message is a delivery confirmation receipt, the original message is found 871, and a determination 873 is made as to whether the original message is found. If the original message is found, the delivery time is added 874 to the document's extended information. If the message is not a confirmation receipt, then the new message contents are saved 877 as a new document, extended information is saved 878 with the new document and the document is marked 879 as "unread". In the case of both receipted documents and new documents, the incoming message is deleted 875 from the inbox and the next control record is searched for 876. This returns the process to the control record found determination 863 until no control record is found, resulting in process termination 866.

FIGS. 36A and 36B are a flow chart showing the processing of an RFC-822 message depicted in box 865 of FIG. 35A. After start 881, the message header is read 882 and a determination 883 is made as to whether the message is a multipart message. In the case of multipart messages, the message may be a "multipart-alternative" message or a "multipart-related" message. A determination 885 is made as to whether the message is a "multipart-alternative" message. If the message is a "multipart-alternative" message, all message parts except for the last part are deleted in 886. If the message is not a "multipart-alternative", a determination 887 is made as to whether the message is a "multipart-related" message. If the message is a "multipart-related" message, all message parts but the first are deleted 888. In any of the above cases (decision 883, decision 885 and decision 887), one message part is read 889 and presented to the user. In any case involving a non-multipart message (decision 883), or a "multipart-alternative" or "multipart-related" message, the remaining message parts are deleted (blocks 886, 888) and the remaining message part has been read 889. At this point, a decision 890 is made as to whether a message part is found. If a message part is found, the message part is processed 891 and a next message part is found 892. The determination 890 is again made as to whether the message part is found until all message parts have been processed. When the message part is not found (determination 890), a determination 893 is made as to whether 2 or more messages are in the inbox. If there are 2 or more messages in the inbox, a determination 894 is made as to whether the first resulting message is text. If the first resulting message is text, the contents of the first resulting message 895 are added as a sticker to all the other resulting messages and the first resulting message is deleted 896 from the inbox. This is a change in the RFC-822 packet in that the contents of the first resulting message has a text message or added as a sticker in step 895.

Figure 37:
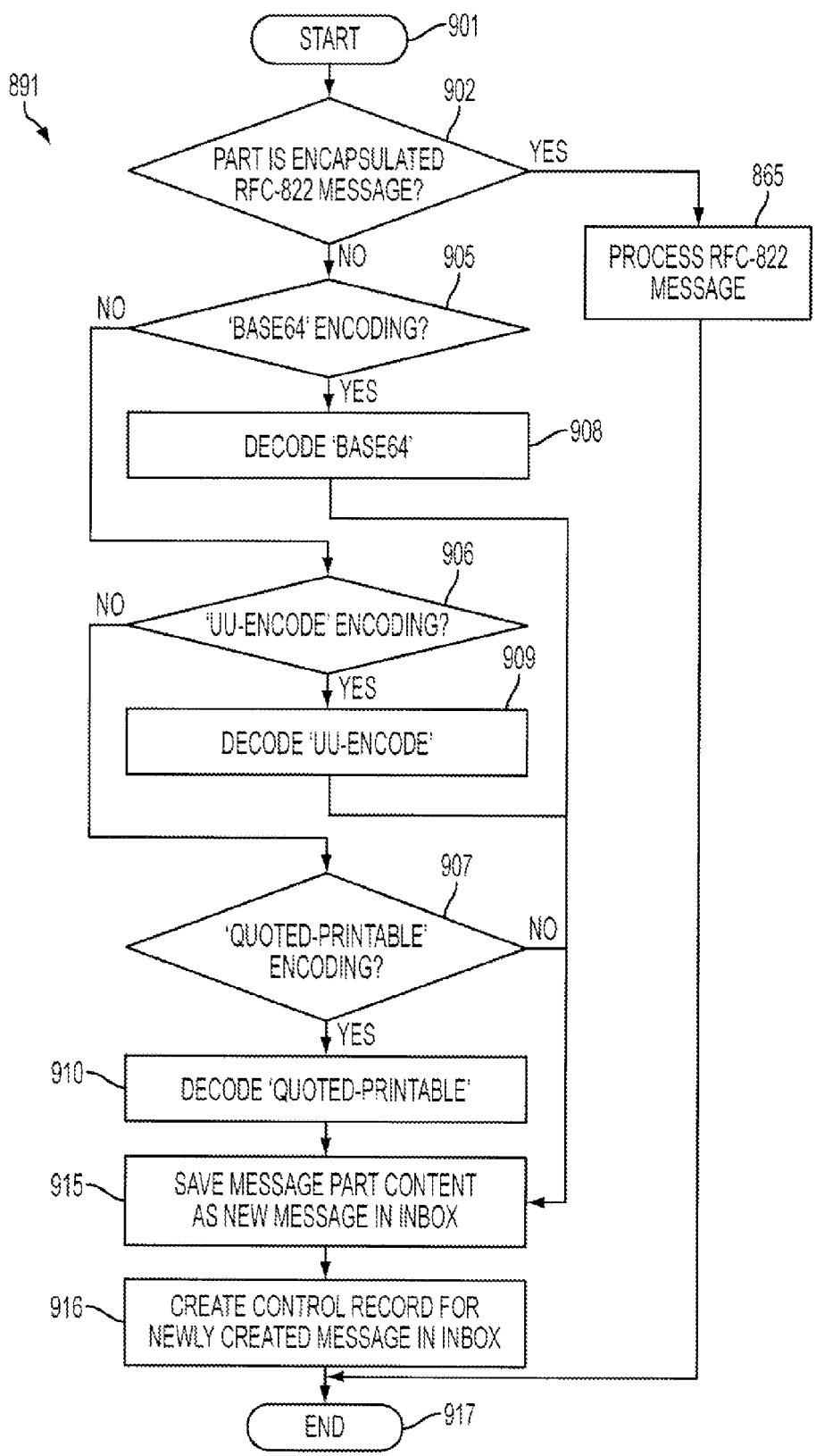
FIG. 37 is a diagrams showing a "process message part" operation used with the "process inbox changes" operation of FIGS. 36A-36B.

FIG. 37 is a flow chart depicting the processing of the message part shown in block 891 of FIG. 36A. Upon start 901, a determination 902 is made as to whether the part is an encapsulated RFC-822 message. If the part is encapsulated RFC-822 message, the message is processed as an RFC-822 message, as depicted in block 865 and described in connection with FIGS. 36A and 36B. This is often the case, wherein an entirely encapsulated RFC-822 message is forwarded by another email client.

If the part is not an encapsulated RFC-822 message, as determined at determination 902, then the series of determinations 905, 906, 907 are made as to whether the message is "Base64", "UUencoded" or "quoted-printable" encoded. The parts are then decoded 908, 909, 910 accordingly.

While the above provides a full and complete disclosure of the exemplary embodiments of this invention, equivalents may be employed without departing from the true spirit and scope of the invention. Therefore, the above description and illustrations should not be construed as limiting the scope of the invention which is defined by the appended claims.

What is claimed is:

1. A non-transitory computer-readable storage medium containing a set of instructions for a general purpose computer having access to storage for computer files organized in a general folder structure, such files comprising (a) files generated by executable application programs that generate various kinds of application files and (b) application type files, the computer providing a computing environment via a user interface comprising an input responsive to user commands and a display capable of displaying the computer files in the general folder structure, the computer-readable storage medium further comprising:
   code for displaying and manipulating in response to user commands or communication with an email server different kinds of application type files within said general folder structure, said general folder structure having one or more activity folders;
   code for storing communication files within said general folder structure, wherein a communication file comprises one or more application type files;
   code for automatically associating the individual application type files comprising a communication with each other;
   code for visibly annotating the communication, or any of the application type files comprising the communication, with information about its one or more communications, and displaying the annotation information within the display of the general folder structure, wherein the annotation information includes whether the communication or file was sent or received, names of senders and recipients of the file, time of the file, and date and time the file was sent and received;
   code for saving any new file created with any application accessible to the user's computing environment into any activity folder within the general folder structure; and
   code for manipulating computer files within the activity folders, thereby allowing a user to group and organize subjectively related files of various application types within any of said activity folders, including grouping files which are associated with communications together with files which are not associated with communications within any of said activity folders.

2. A method for displaying and manipulating computer files within a general purpose computer having access to storage for computer files organized in a general folder structure, such files comprising (a) files generated by executable application programs that generate various kinds of application files and (b) application type files, the computer providing a computing environment via a user interface comprising an input responsive to user commands and a display capable of displaying the computer files in the general folder structure, comprising:
   displaying and manipulating in response to user commands or communication with an email server different kinds of application type files within said general folder structure, said general folder structure having one or more activity folders into which any new file created with any application accessible to the user's computing environment can be saved into any of said activity folders;
   storing communication files within said general folder structure, wherein a communication file comprises one or more application type files;
   automatically associating the individual application type files comprising a communication with each other;
   visibly annotating the communication, or any of the application type files comprising the communication, with information about its one or more communications, and displaying the annotation information within the display of the general folder structure, wherein the annotation information includes whether the communication or file was sent or received, names of senders and recipients of the file, time of the file, and date and time the file was sent and received; and
   manipulating, in response to user commands, computer files within the activity folders, thereby allowing a user to group and organize subjectively related files of various application types within any of said activity folders, including grouping files which are associated with communications together with files which are not associated with communications within any of said activity folders.

3. A method for displaying and manipulating computer files within a general purpose computer having access to storage for computer files organized in a general folder structure, such files comprising (a) files generated by executable application programs that generate various kinds of application files and (b) application type files, the computer providing an environment via a user interface comprising an input responsive to user commands and a display capable of displaying the computer files in the general folder structure relating to a user selected activity, the method comprising:
   displaying and manipulating in response to user commands or communication with an email server different kinds of application type files in the general folder structure, the different kinds of application type files corresponding to said user selected activity, including the displaying of files which are associated with communications together with files which are not associated with communications within said user selected activity,
   visibly annotating a communication, or any application type files comprising the communication, with information about its one or more communications, and displaying the annotation information within the display of the general folder structure, wherein the annotation information includes whether the communication or file was sent or received, names of senders and recipients of the file, time of the file, and date and time the file was sent and received;
   wherein an activity comprises any user-defined class of related files whereby a user lumps together different categories of information stored and accessed from different files into a conceptual whole and classifies the whole as a project, task, operation, etc., and where an activity contains related files which were not each created by the same application programs.

4. A method for visibly annotating any individual application type file, located or stored within a general folder structure within a general purpose computer and which has at any point been sent or received as a part of a communication, with information about its one or more communications, from within its location in the general folder structure, comprising:

in response to user commands or communication with an email server, receiving and storing annotation information pertaining to the individual application type file; and displaying the annotation information, wherein the annotation information is displayed within a display of the general folder structure, wherein the general folder structure may contain any application type files available to a user on the computer, and wherein the annotation information includes whether the application type file was sent or received, names of senders and recipients of the file, time of the file, and date and time the file was sent and received.

5. A non-transitory computer-readable storage medium containing a set of instructions for a general purpose computer having access to storage for computer files, such files comprising (a) files generated by executable application programs that generate various kinds of application files and (b) application type files, the computer providing a computing environment via a user interface comprising an input responsive to user commands and a display capable of presenting the computer files in a general folder structure, the computer-readable storage medium further comprising:

code for receiving and storing annotation information pertaining to the individual application type file, in response to user commands or communication with an email server; and code for displaying the annotation information, wherein the annotation information is displayed within a display of the general folder structure, wherein the annotation information includes whether the application type file was sent or received, names of senders and recipients of the file, time of the file, and date and time the file was sent and received.

6. A method for displaying and manipulating computer files within an information handling system comprising a general purpose computer having access to storage for communication files organized in a general folder structure, such files comprising (a) files generated by executable application programs that generate various kinds of application files, (b) application type files, (c) email messages, and their (d) attachments generated by various executable application programs, the computer providing a computing environment via user interface comprising an input responsive to user commands and a display capable of presenting the files in one or more folders in the general folder structure, the method comprising:

in response to user commands or communications with an email server, automatically identifying a particular communication comprising one or more files of one or more application types, including both email message and attachments;

automatically storing the communication in one folder in the general folder structure;

automatically generating code for associating the individual parts of the communication in the general folder structure with each other;

automatically visibly annotating the communication, or any of the application type files comprising the communication, with information about its one or more communications, and displaying the annotation information within the display of the general folder structure, wherein the annotation information includes whether the communication or file was sent or received, names of senders and recipients of the file, time of the file, and date and time the file was sent and received; and automatically allowing each of the individual files comprising the communication in the general folder structure to be manipulated and processed independently of one another by the user, including processing and performing operations on any one of the attachments without having to so process the email message.

7. A non-transitory computer-readable storage medium containing a set of instructions for a general purpose computer having access to storage for communication files organized in a general folder structure, such files comprising (a) files generated by executable application programs that generate various kinds of application files, (b) application type files, (c) email messages, and their (d) attachments generated by various executable application programs, the computer providing a computing environment via user interface comprising an input responsive to user commands and a display capable of presenting the files in one or more folders in the general folder structure, comprising:

code for, in response to user commands or communications with an email server, automatically identifying a particular communication comprising one or more files of one or more application types, including both email message and attachments;

code for automatically storing the communication in one folder in the general folder structure;

code for automatically generating code for associating the individual parts of the communication in the general folder structure with each other;

code for automatically visibly annotating the communication, or any of the application type files comprising the communication, with information about its one or more communications, and displaying the annotation information within the display of the general folder structure, wherein the annotation information includes whether the communication or file was sent or received, names of senders and recipients of the file, time of the file, and date and time the file was sent and received; and code for automatically allowing each of the individual files comprising the communication in the general folder structure to be manipulated and processed independently of one another by the user, including processing and performing operations on any one of the attachments without having to so process the email message.

* * * * *